US008612692B2

(12) United States Patent
Yasufuku et al.

(10) Patent No.: US 8,612,692 B2
(45) Date of Patent: Dec. 17, 2013

(54) VARIABLE WRITE BACK TIMING TO NONVOLATILE SEMICONDUCTOR MEMORY

(75) Inventors: Kenta Yasufuku, Kawasaki (JP); Masaki Miyagawa, Kawasaki (JP); Goh Uemura, Kawasaki (JP); Tsutomu Owa, Kawasaki (JP); Tsutomu Unesaki, Hachioji (JP); Atsushi Kunimatsu, Funabashi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 247 days.

(21) Appl. No.: 13/052,203

(22) Filed: Mar. 21, 2011

(65) Prior Publication Data
US 2012/0030428 A1 Feb. 2, 2012

(30) Foreign Application Priority Data

Jul. 30, 2010 (JP) .................................. 2010-172758

(51) Int. Cl.
*G06F 12/12* (2006.01)
(52) U.S. Cl.
USPC .................................. 711/143; 711/E12.076
(58) Field of Classification Search
USPC .................. 711/135, 143, E12.073, E12.075, 711/E12.076
See application file for complete search history.

(56) References Cited

U.S. PATENT DOCUMENTS

| 6,134,634 | A | * | 10/2000 | Marshall et al. | ............... | 711/143 |
| 6,145,058 | A | * | 11/2000 | Suganuma | .................... | 711/134 |
| 2004/0230746 | A1 | * | 11/2004 | Olds et al. | ...................... | 711/133 |
| 2006/0236033 | A1 | * | 10/2006 | Guinn et al. | .................. | 711/118 |
| 2008/0244165 | A1 | | 10/2008 | Kunimatsu | | |
| 2009/0083478 | A1 | | 3/2009 | Kunimatsu et al. | | |
| 2009/0138654 | A1 | * | 5/2009 | Sutardja | ......................... | 711/103 |
| 2010/0064111 | A1 | * | 3/2010 | Kunimatsu et al. | ........... | 711/161 |
| 2010/0185804 | A1 | | 7/2010 | Omizo et al. | | |
| 2010/0235580 | A1 | * | 9/2010 | Bouvier | ....................... | 711/129 |
| 2011/0161555 | A1 | * | 6/2011 | Olds et al. | ...................... | 711/103 |
| 2012/0030428 | A1 | | 2/2012 | Yasufuku et al. | | |
| 2012/0191900 | A1 | | 7/2012 | Kunimatsu et al. | | |
| 2012/0246397 | A1 | | 9/2012 | Nakai et al. | | |

FOREIGN PATENT DOCUMENTS

| JP | 7-146820 A | 6/1995 |
| JP | 2001-266580 A | 9/2001 |
| JP | 2008-242944 A | 10/2008 |
| WO | WO 2011/086732 A1 | 7/2011 |

OTHER PUBLICATIONS

U.S. Appl. No. 12/884,601, filed Sep. 17, 2010, Hiroto Nakai, et al.
U.S. Appl. No. 12/970,145, filed Dec. 16, 2010, Tsutomu Owa, et al.
Daniel P. Bovet and Marco Cesati, "Understanding the Linux Kernel: From I/O Ports to Process Management", O'Reilly®, 3$^{rd}$ Edition (Covers Version 2.6), Oct. 2007, Chapter 15: The Page Cache, pp. 622-629, Chapter 17: Page Frame Reclaiming, pp. 677-737.

* cited by examiner

*Primary Examiner* — Hal Schnee
(74) *Attorney, Agent, or Firm* — Oblon, Spivak, McClelland, Maier & Neustadt, L.L.P.

(57) ABSTRACT

According to one embodiment, an information processing device includes a first determination section and a setting section. The first determination section determines inconsistency between first data and second data. The first data is stored in a nonvolatile semiconductor memory. The second data is corresponding to the first data and stored in a semiconductor memory. The setting section sets execution timing of write back based on access frequency information associated with the second data.

12 Claims, 17 Drawing Sheets

| Data identification information | Information on time at which last write access has occurred |
|---|---|
| D1 | LT1 |
| ⋮ | ⋮ |
| Dm | LTm |

| Data identification information | Number of times it is determined that data is in dirty state after last write back |
|---|---|
| D1 | A1 |
| ⋮ | ⋮ |
| Dm | Am |

| Data identification information | Number of times of write access to volatile semiconductor memory after last write back |
|---|---|
| D1 | B1 |
| ⋮ | ⋮ |
| Dm | Bm |

F I G. 8

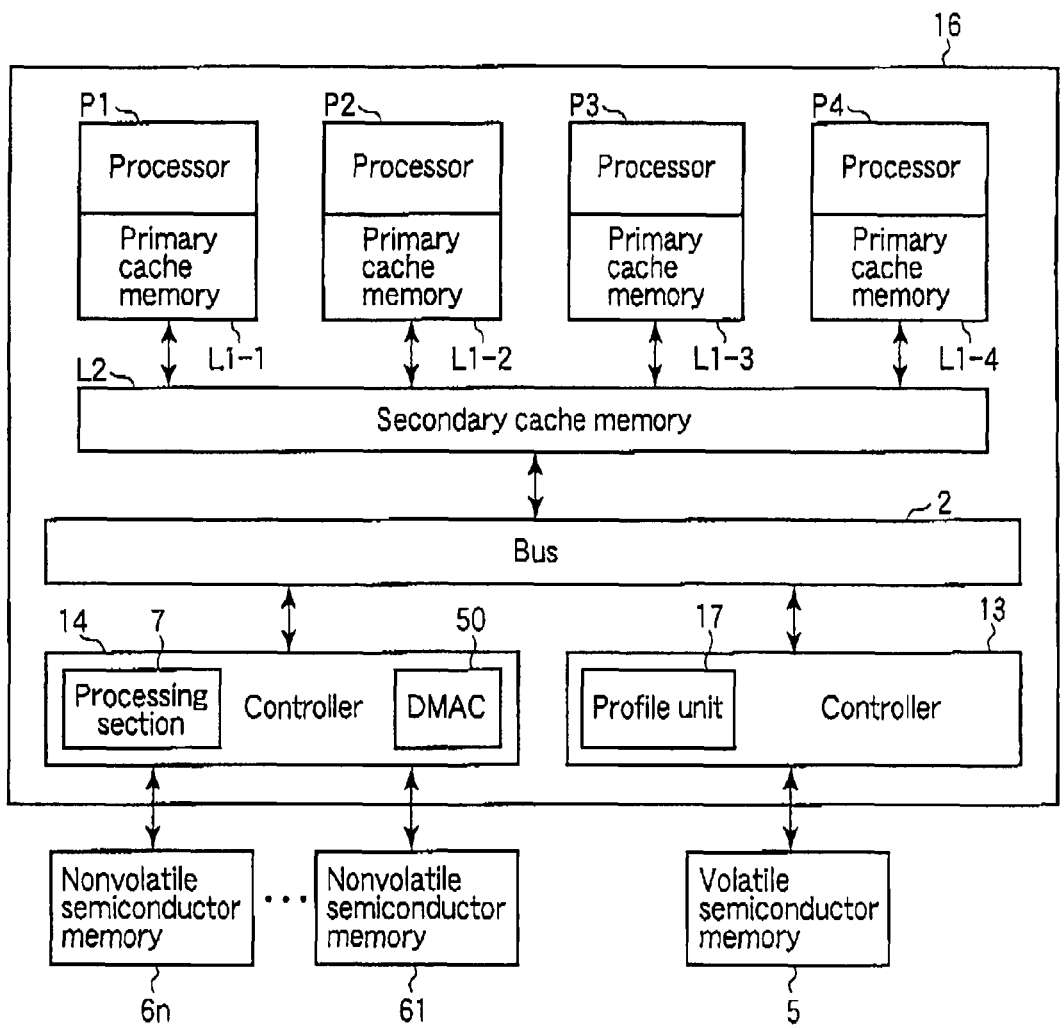
F I G. 14

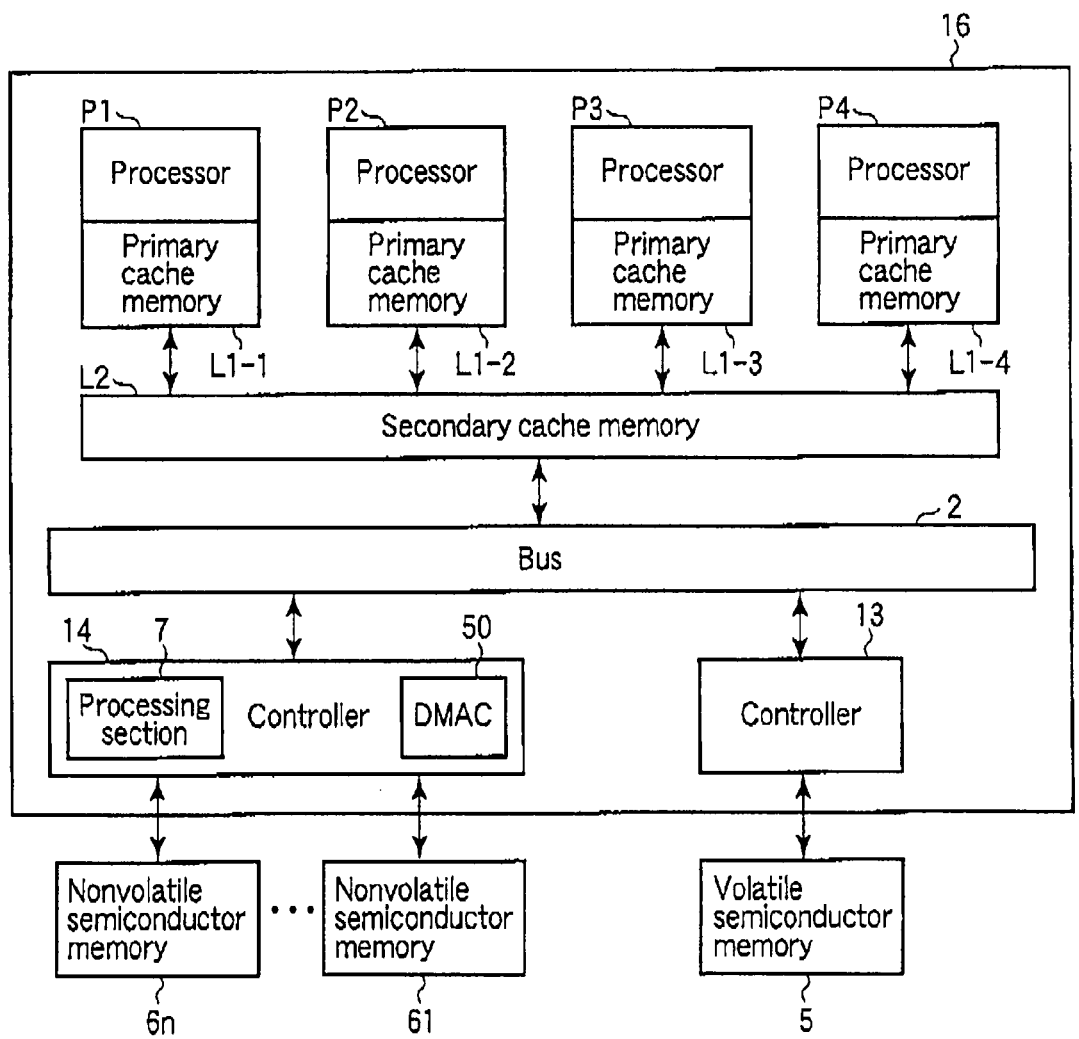
F I G. 15

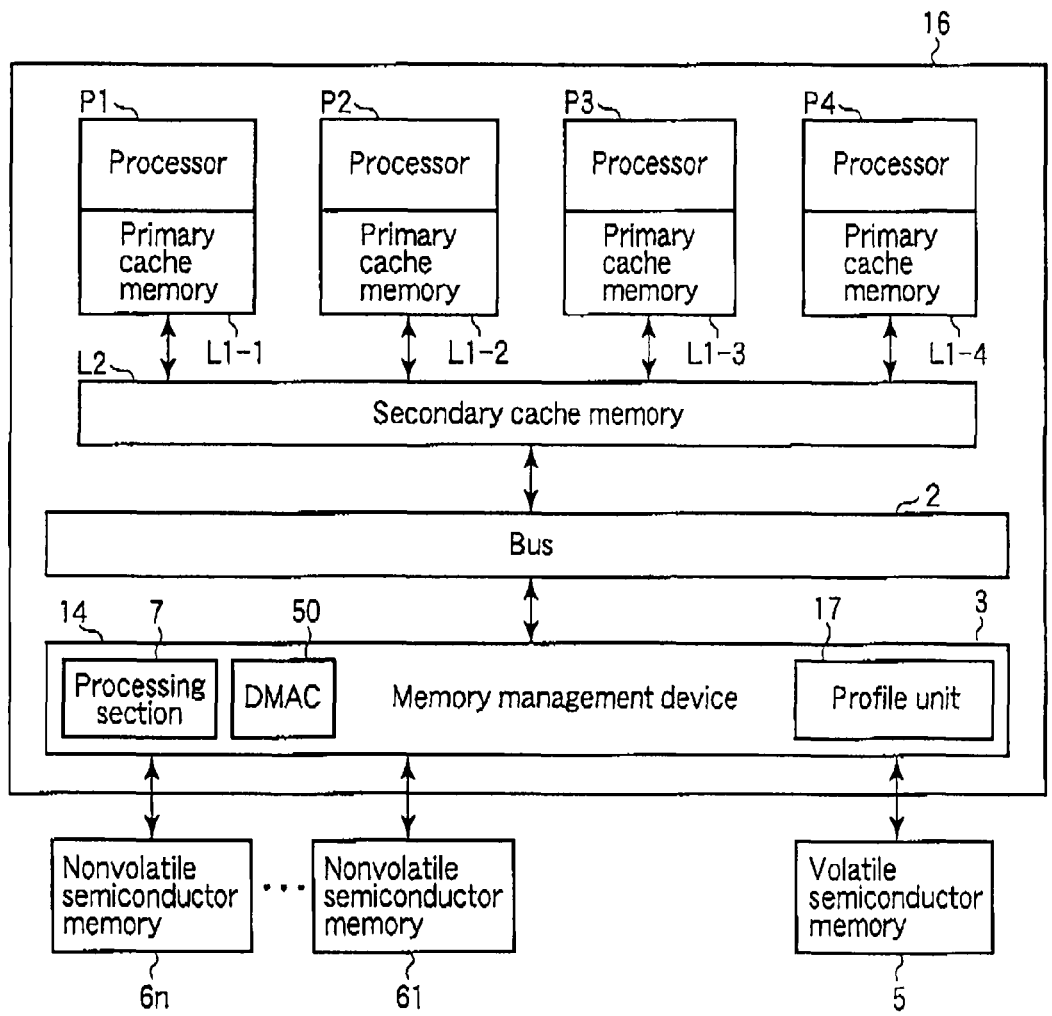
F I G. 16

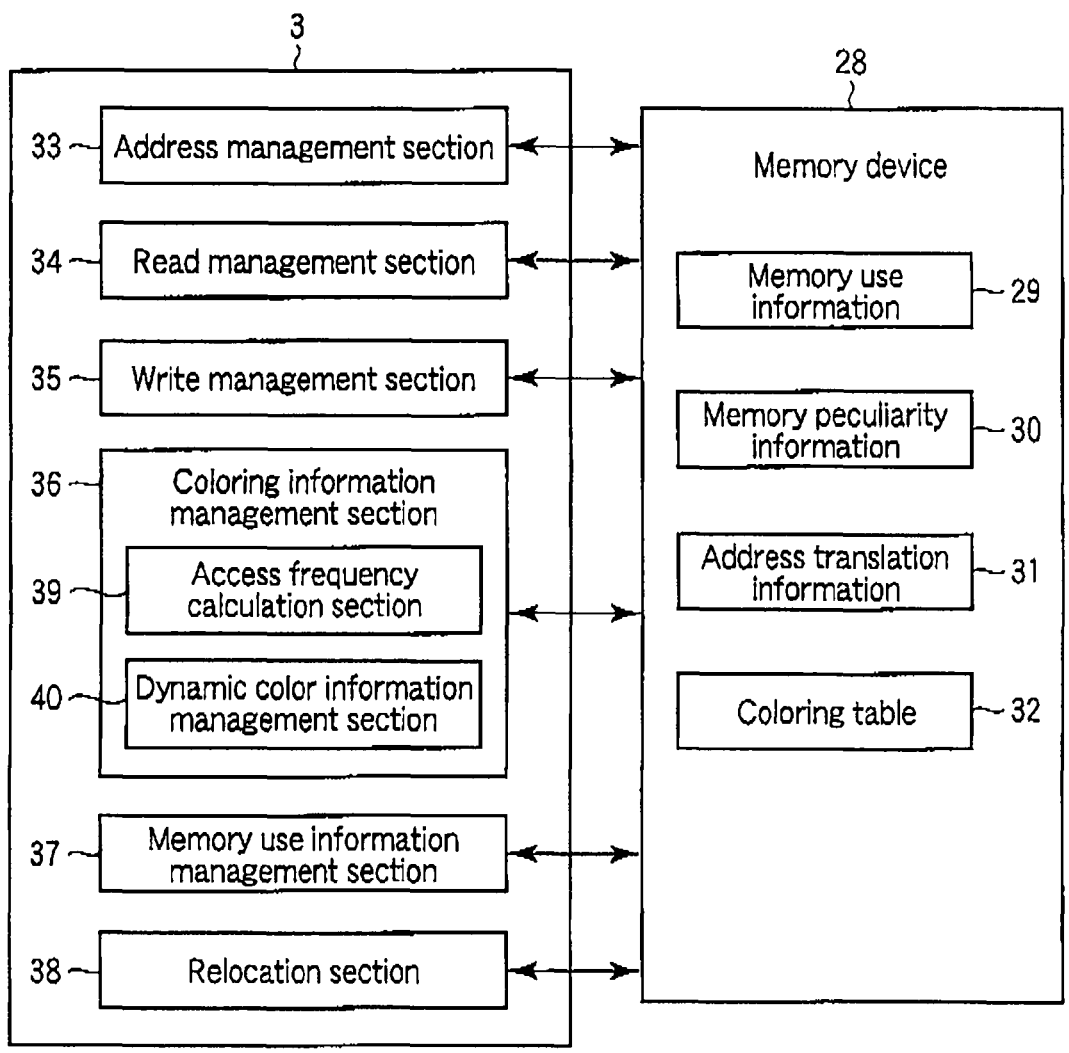
F I G. 18

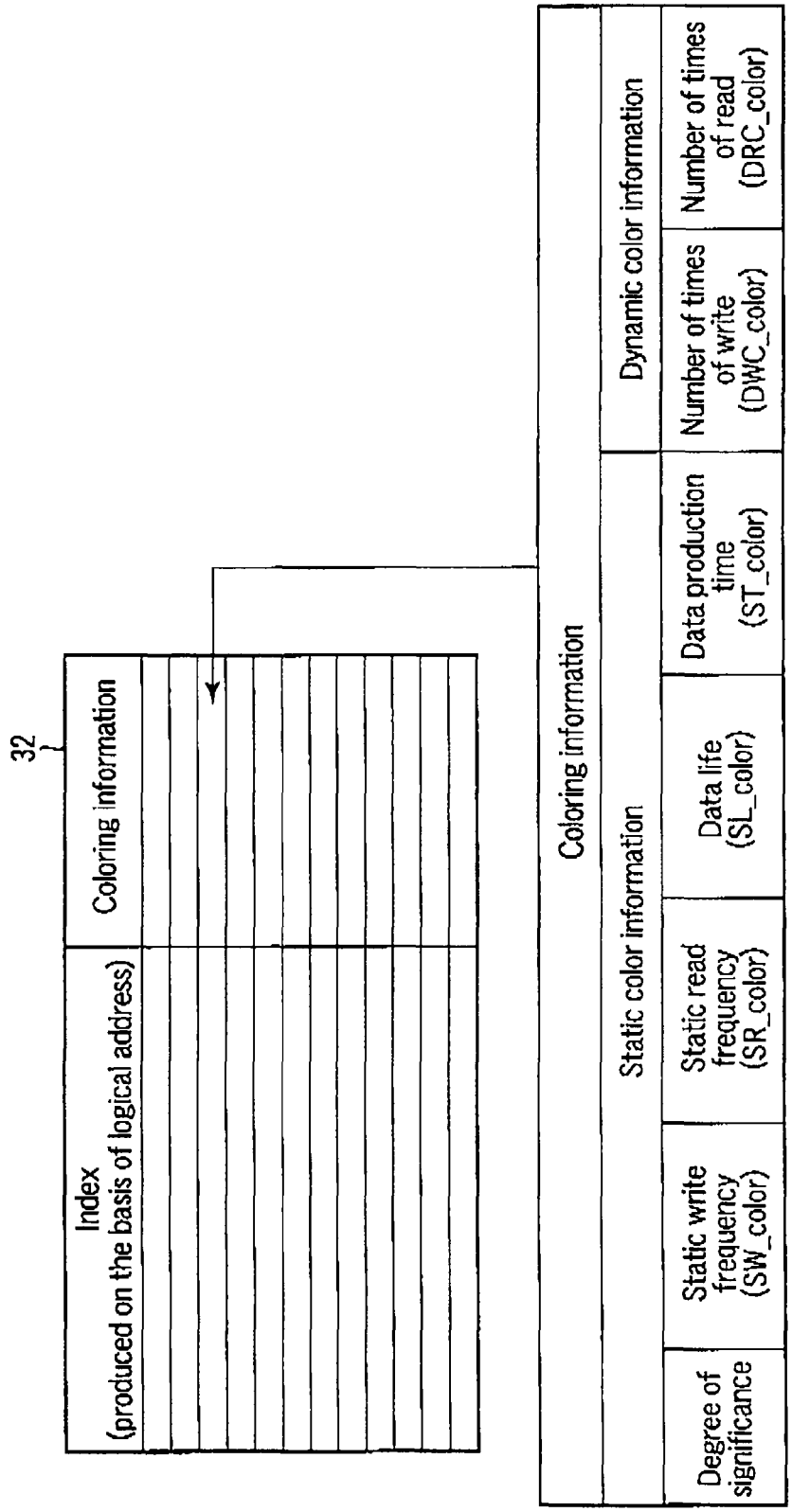
F I G. 19

VARIABLE WRITE BACK TIMING TO NONVOLATILE SEMICONDUCTOR MEMORY

CROSS-REFERENCE TO RELATED APPLICATIONS

This application is based upon and claims the benefit of priority from Japanese Patent Application No. 2010-172758, filed Jul. 30, 2010; the entire contents of which are incorporated herein by reference.

FIELD

Embodiments described herein relate generally to an information processing device, memory management device, and memory management method.

BACKGROUND

In a virtual memory technique, when cache miss occurs, data is transferred from a secondary memory to a main memory. However, transfer processing takes time, and lowers the performance of the overall system.

In the virtual memory technique, "write back" is used to keep coherency between the main memory and the secondary memory. In other word, the write back is used to reduce dirty entries in the main memory. In a general operating system (OS) has a function of periodically check the dirty entries in the main memory and of writing back the data from the main memory to the secondary memory to keep coherency.

However, with conventional write back technique, the write back is performed with predetermined fixed time interval, for example, 30 seconds after the last (latest) write access.

BRIEF DESCRIPTION OF THE DRAWINGS

FIG. 8 is a view showing an example of a write count table;

FIG. 14 is a block diagram showing a second modification example of the information processing device according to the third embodiment;

FIG. 15 is a block diagram showing a third modification example of the information processing device according to the third embodiment;

FIG. 16 is a block diagram showing a fourth modification example of the information processing device according to the third embodiment;

FIG. 18 is a block diagram showing an example of a relationship between a memory management device according to a fourth embodiment and various data stored in a memory device; and FIG. 19 is a view showing an example of coloring information and a coloring table according to the fourth embodiment.

DETAILED DESCRIPTION

Figure 1:
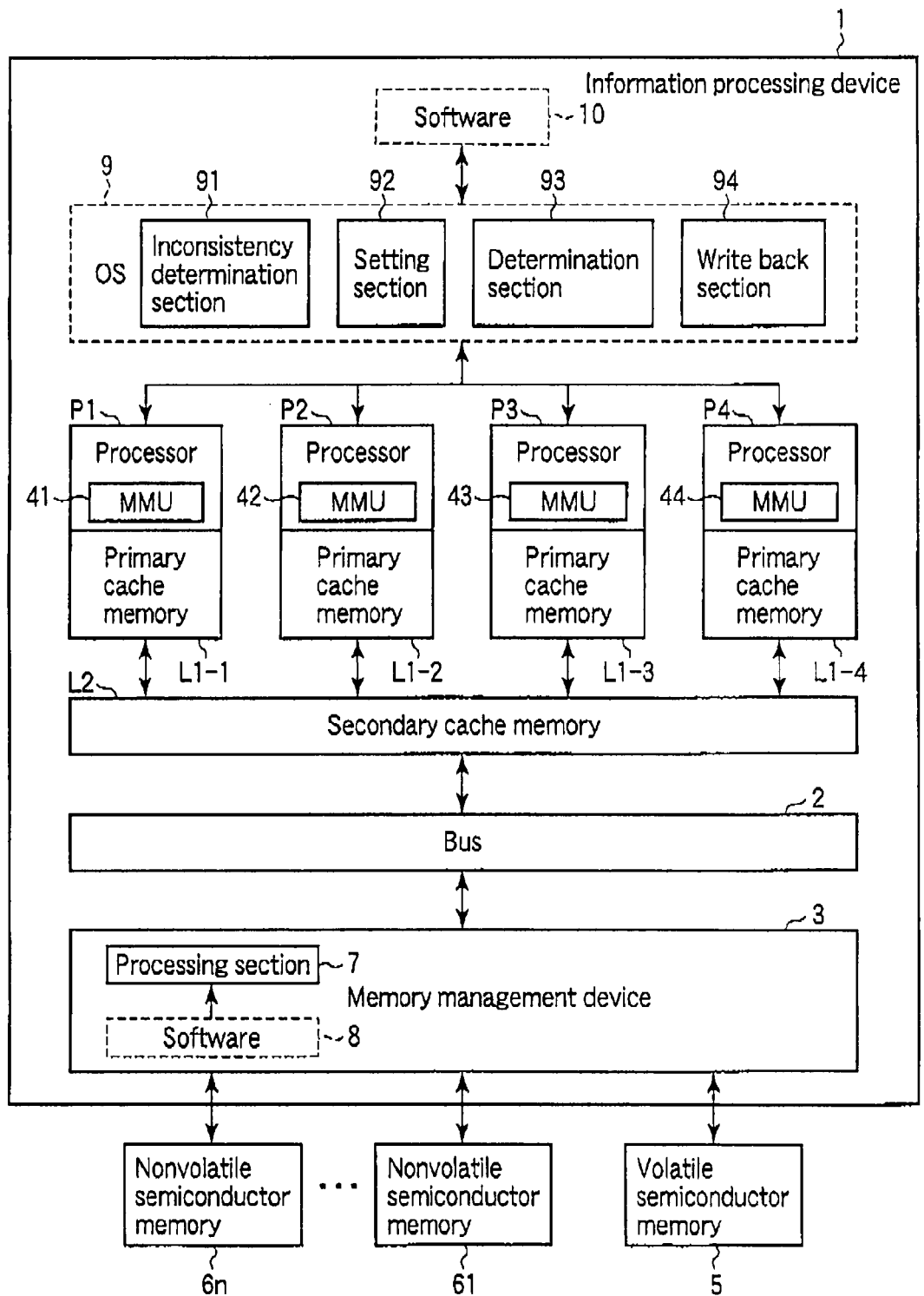
FIG. 1 is a block diagram showing an example of a configuration of an information processing device according to a first embodiment.

In general, according to embodiments, an information processing device includes a first determination section, a setting section, a second determination section, and a write back section. The first determination section determines inconsistency between first data and second data. The first data is stored in a nonvolatile semiconductor memory. The second data is corresponding to the first data and stored in a semiconductor memory. The setting section sets execution timing of write back based on access frequency information associated with the second data. The second determination section determines whether a time elapsed from a last write back time of the second data reaches the execution timing set by the setting section. The write back section, when the second determination section determines that the execution timing of write back of the second data is reached, executes the write back.

Embodiments will be explained below with reference to accompanying drawings. In the drawings, the same reference numbers and symbols denote the same or substantially same elements, and a description thereof will be omitted or briefly described. Only different parts will be explained in detail.

First Embodiment

FIG. 1 is a block diagram showing a configuration example of an information processing device according to this embodiment.

An information processing device 1 is, for example, a System-on-a-Chip (SoC). The information processing device 1 is provided with processors P1 to P4, a secondary cache memory L2, bus 2, and memory management device 3.

Each of the processors P1 to P4 is provided with a primary cache memory L1-1 to L1-4, and MMU 41 to 44. Although as each of the processors P1 to P4, for example, a Central Processing Unit (CPU) is used, another processing unit such as a Micro Processor Unit (MPU), Graphic Processor Unit (GPU), and the like may also be used. In FIG. 1, although the number of the processors P1 to P4 is four, it is sufficient if the number of processors is one or more.

The processors P1 to P4 share the secondary cache memory L2 with each other, and are electrically connected to the memory management device 3 through the bus 2.

The memory management device 3 is electrically connected to an external volatile semiconductor memory 5, and nonvolatile semiconductor memories 61 to 6n. The processors P1 to P4 can access the volatile semiconductor memory 5, and nonvolatile semiconductor memories 61 to 6n via the memory management device 3.

The processors P1 to P4, and memory management device 3 are connected to each other so that the processors P1 to P4 and memory management device 3 can transmit/receive data to/from each other by the bus 2. Further, for example, the processors P1 to P4, and the memory management device 3 can operate asynchronously and, while the processors P1 to P4 are executing processing, the memory management device 3 can execute wear leveling, garbage collection or compaction with respect to the nonvolatile semiconductor memories 61 to 6n.

It should be noted that in this embodiment, although the information processing device 1 and at least one of the volatile semiconductor memory 5 and the nonvolatile semiconductor memories 61 to 6n are made separate chips, the information processing device 1 and the at least one of the volatile semiconductor memory 5 and the nonvolatile semiconductor memories 61 to 6n may be configured in such a manner that the at least one of the volatile semiconductor memory 5 and the nonvolatile semiconductor memories 61 to 6n are included in the information processing device 1.

A processing section 7 is provided inside the memory management device 3. As the processing section 7, although, for example, an MPU is used, another processing unit may be used.

The processing section 7 controls various processing to the nonvolatile semiconductor memories 61 to 6n based on software 8. In this embodiment, processing to the nonvolatile semiconductor memories 61 to 6n may be carried out by both the processors P1 to P4 and processing section 7. For example, the software 8 is stored in the nonvolatile semiconductor memories 61 to 6n, and is read from the nonvolatile semiconductor memories 61 to 6n by the processing section 7 at the time of startup to be executed.

For example, the volatile semiconductor memory 5, and nonvolatile semiconductor memories 61 to 6n may be used as a main memory. In this embodiment, a sufficient memory amount is secured in the nonvolatile semiconductor memories 61 to 6n. A memory capacity of the nonvolatile semiconductor memories 61 to 6n is larger than a memory capacity of the volatile semiconductor memory 5. Further, data having the higher possibility of being accessed such as recently accessed data, data having a high use frequency or the like is cached from the nonvolatile semiconductor memories 61 to 6n to the volatile semiconductor memory 5. When the processors P1 to P4 access the volatile semiconductor memory 5, if data to be accessed is not present in the volatile semiconductor memory 5, data transfer is executed between the nonvolatile semiconductor memories 61 to 6n and volatile semiconductor memory 5.

In this embodiment, the volatile semiconductor memory 5 is, for example, a Dynamic Random Access Memory (DRAM). However, as the volatile semiconductor memory 5, a memory used in a computer as a main memory, such as a Fast Page Mode DRAM (FPM-DRAM), Extended Data Out DRAM (EDO-DRAM), Synchronous DRAM (SDRAM) or the like may be used in place of the DRAM. A nonvolatile random access memory such as a Magnetoresistive Random Access Memory (MRAM), Ferroelectric Random Access Memory (FeRAM) or the like may be used in place of the volatile semiconductor memory 5 if it enables high-speed random access of the same degree as a DRAM, and has no substantial limit for the access-enabled upper limit number of times.

In this embodiment, the nonvolatile semiconductor memories 61 to 6n are, for example, NAND flash memories. However, as the nonvolatile semiconductor memories 61 to 6n, another type of nonvolatile semiconductor memory such as NOR flash memories or the like may be used.

Although the volatile semiconductor memory 5 has smaller capacity (for example, 128 Mbytes to 4 Gbytes) than the nonvolatile semiconductor memories 61 to 6n, it can make access at high speed.

Although the nonvolatile semiconductor memories 61 to 6n have larger capacity (for example, 32 Gbytes to 512 Gbytes) than the volatile semiconductor memory 5, the access speed of the nonvolatile semiconductor memories 61 to 6n is slow. As in this embodiment, when the nonvolatile semiconductor memories 61 to 6n are NAND flash memories, write and read are executed in units of pages. Erase is carried out in units of blocks each of which includes a plurality of pages.

In each of the nonvolatile semiconductor memories 61 to 6n, there is a limit in the maximum number of times of write (for example, 10,000 times or 30,000 times) and, when the number of times is exceeded, the error rate increases, and it may become important to guarantee correct data write as a device.

In the information processing device 1, software such as an OS 9, application, or the like is executed by the processors P1 to P4.

The OS 9 includes an inconsistency determination section 91, setting section 92, determination section 93, and write back section 94. The inconsistency determination section 91 determines inconsistency (incoherency) between first data in the nonvolatile semiconductor memories 61 to 6n used as the main memory, and second data stored in the volatile semiconductor memory 5 used as a cache memory of the nonvolatile semiconductor memories 61 to 6n.

Here, a relationship between the first data in the nonvolatile semiconductor memories 61 to 6n, and second data in the volatile semiconductor memory 5 will be described below with reference to FIG. 2.

A plurality of data are stored in the nonvolatile semiconductor memories 61 to 6n. As described previously, among the plurality of data stored in the nonvolatile semiconductor memory 61, data having the higher possibility of being accessed is cached to the volatile semiconductor memory 5. In this embodiment, data in the nonvolatile semiconductor memories 61 to 6n is called the first data, and data cached to the volatile semiconductor memory 5 is called the second data. That is, when the first data in the nonvolatile semiconductor memories 61 to 6n is cached to the volatile semiconductor memory 5, the cached data is called the second data. Further, the relationship between the first data and second data is called "corresponding".

The first data, and second data are identical immediately after the caching of the second data. However, when write access is made to the second data from the processors P1 to P4, the second data is updated, and the first data and second data are inconsistent with each other (dirty state). Thereafter, the second data in the volatile semiconductor memory 5 is written back to the first data in the nonvolatile semiconductor memories 61 to 6n in such a manner that the second data and first data become consistent (coherent) with each other. Thereby, the first data and second data become consistent with each other. As described above, the dirty state occurs during a period from write access to the second data to an execution of write back.

When it is determined by the inconsistency determination section 91 that the first data and second data are inconsistent with each other, the setting section 92 sets execution timing of write back for making the first data and second data consistent with each other. The setting section 92 sets execution timing based on access frequency information associated with the second data. The access frequency information, and setting of the execution timing of write back will be described later in detail.

The determination section 93 determines whether or not a time elapsed from a lastly written back time of the second data reaches the execution timing set by the setting section 92.

When it is determined by the determination section 93 that the elapsed time reaches the execution timing of write back of the second data, the write back section 94 executes write back.

Next, operations of the OS 9 will be described below in detail.

As described previously, when data to be accessed is not present in the volatile semiconductor memory 5, data transfer is executed between the nonvolatile semiconductor memories 61 to 6*n* and volatile semiconductor memory 5. In this embodiment, in order to transfer the data, the Memory Management Unit (MMU) 41 to 44 incorporated in each of the processors P1 to P4 is utilized. Data present in the volatile semiconductor memory 5 is registered in the MMU 41 to 4*n*, and is in the accessible state. On the other hand, data not present in the volatile semiconductor memory 5 is not registered in the MMU 41 to 44 and, when the data not present in the volatile semiconductor memory 5 is accessed, MMU exception is generated. By the MMU exception, switching from the software 10 on the processors P1 to P4 to the OS 9 is executed, and data transfer from the nonvolatile semiconductor memories 61 to 6*n* to the volatile semiconductor memory 5 is executed by the OS 9. Further, when necessary data is transferred from the nonvolatile semiconductor memories 61 to 6*n* to the volatile semiconductor memory 5 by the OS 9, a table necessary for the operations of the MMUs 41 to 44 is rewritten, the transferred data is made accessible, and the processing is returned from the OS 9 to the software 10. A data processing unit of the data transfer is a size of 4 Kbytes or 1 Mbytes, and is generally called a page size. It should be noted that the page size of this data transfer operation, and page size of a write unit or a read unit of the NAND flash memory are used in different meanings.

For the OS 9 and software 10, when the above-mentioned data transfer operation occurs, the processing is suspended for a time corresponding to the data transfer time, and lowering of the performance. Accordingly, it is important to shorten the processing time of the data transfer.

When new data is transferred from the nonvolatile semiconductor memories 61 to 6*n* to the volatile semiconductor memory 5 by the above data transfer, if data stored in the area of the data transfer destination in the volatile semiconductor memory 5 is in the dirty state, it is not possible to transfer new data from the nonvolatile semiconductor memories 61 to 6*n* to the volatile semiconductor memory 5 unless the transfer of the new data is carried out after the data in the dirty state stored in the transfer destination is once write back from the volatile semiconductor memory 5 to the nonvolatile semiconductor memories 61 to 6*n*. Accordingly, when data transfer is executed, if the transfer destination area is in the dirty state, the processing time of the data transfer becomes long.

When write back is frequently executed in order to reduce areas in the dirty state for the purpose of preventing such processing time from becoming longer, the number of times of write to the nonvolatile semiconductor memories 61 to 6*n* is increased, and a life (lifetime) of each of the nonvolatile semiconductor memories 61 to 6*n* may become shorter.

In the information processing device 1 of this embodiment, the execution timing of write back to the nonvolatile semiconductor memories 61 to 6*n* is controlled based on the access frequency information associated with the second data in the volatile semiconductor memory 5, whereby it is made possible to shorten the processing time of data transfer, and prevent the life of the nonvolatile semiconductor memory 61 to 6*n* from being made shorter.

Next, the access frequency information will be described below.

In the information processing device 1, the access frequency information corresponding to data is used in order to determine whether or not write back is to be carried out. The access frequency information is information imparted to, for example, data for each page size, and determined on the basis of characteristic (feature or attribute of data) of the data, and is further information representing an access frequency of the data. In this embodiment, the access frequency is determined on the basis of, for example, the characteristic of the data, and represents the number of times of access to the data occurring per unit time, or the like. The access frequency information is managed by, for example, an access frequency information management table (not shown). The access frequency information management table is managed by, for example, at least one of the OS 9 and the memory management device 3, and is allocated (arranged) in the volatile semiconductor memory 5 or a storage section (not shown) in the memory management device 3.

The access frequency information is defined on the basis of a program feature, or the characteristic of the data. For example, the characteristic of the data is determined based on where the data is allocated among the area of txt area, stack area, heap area, or data area of a program.

It should be noted that as the access frequency information, for example, coloring information to be described later may also be used.

The setting section 92 provided in the OS 9 changes a time from write access to write back, on the basis of access frequency information. In the existing write back processing (write back control), the time is determined constant.

A first example of write back processing will be described below.

For example, in the existing write back processing, it is assumed that setting is made in such a manner that write back of data in a dirty area is executed after an elapse of 30 seconds from write access. In this case, if 2nd write access occurs after an elapse of 32 seconds from 1st write access to certain data, it is needed to write back twice in order to eliminate the dirty state. That is, the data is brought into the dirty state by a first write access, a first write back is executed after an elapse of 30 seconds from the first write access, a second write access to the data is executed 2 seconds after the first write back, thereby bringing the data into the dirty state again, and a second write back occurs 30 seconds after the second write access.

Conversely, in this embodiment, setting is made in such a manner that write back of the data is executed after an elapse of time longer than 32 seconds from the 1st write access. Thereby, it is possible to eliminate the dirty state by executing write back processing once after the first write access and second write access. Accordingly, it becomes possible to prevent the number of times of occurrence of write back from increasing.

A second example of write back processing will be described below.

In the existing write back processing, when write access to data having a low write frequency is occurred, the dirty state is remained until a set period elapses.

Conversely, in this embodiment, with respect to data having a write access frequency which is lower than a predetermined value, and the data of write access is made single-shot, and next access does not occur for a while on the basis of the access frequency information, write back of the data is executed after an elapse of a short time from the write access of the data. Thereby, it is possible to reduce data areas in the dirty state.

As described above, in this embodiment, it is possible to reduce the number of times of write back from the volatile semiconductor memory 5 to the nonvolatile semiconductor memories 61 to 6n and, as a result, it is possible to prevent the life of the nonvolatile semiconductor memory 61 to 6n from being made shorter. Further, in this embodiment, it is possible to reduce the dirty states, and prevent the processing time of data transfer from the nonvolatile semiconductor memories 61 to 6n to the volatile semiconductor memory 5 from becoming longer.

Here, a specific example of a method of setting a time from the last write access to the execution of write back based on the access frequency information will be described below.

Data (data based on the stack area or the heap area) allocated in the stack area or the heap area is data having the very strong possibility of being accessed again even when no access to the data occurs for a certain period, and has a feature different from data allocated in another data area. The data allocated in the stack area or the heap area has the stronger possibility that access to the data occurs shortly after write back than the data allocated in the other data area. Accordingly, regarding write back of the data allocated in the stack area or the heap area the time from the last write access to the data to the execution of the write back is set longer than the normal case rather than that write back is carried out after a common predetermined time from the last write access without distinction between the data allocated in the stack area or the heap area and the data allocated in the other data area.

Thereby, it is possible to reduce the number of times of write access occurring shortly after write back and, as a result, it is possible to reduce the number of times of write to the nonvolatile semiconductor memories 61 to 6n.

The specific example which has been described here is an example of this embodiment, and it is possible to increase/decrease the time from the last write access to the write back in another access pattern or area from another point of view.

Figures 2, 3, 4:
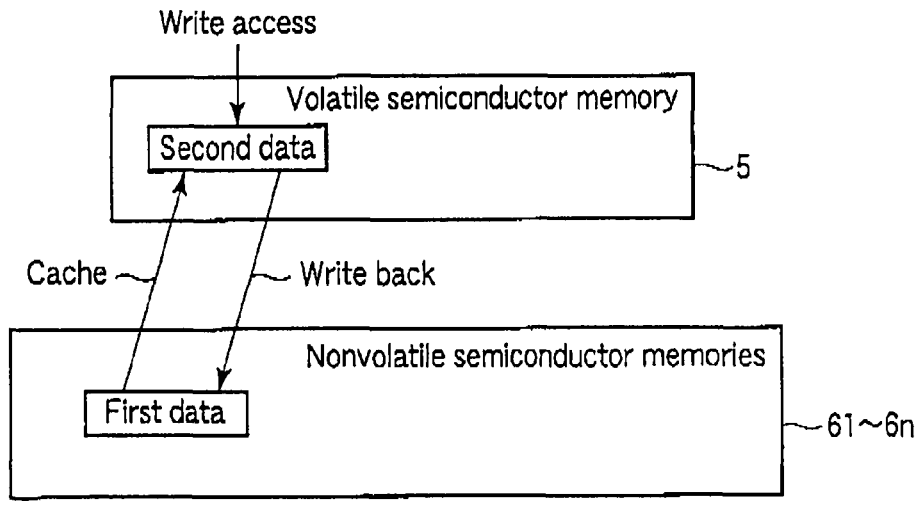
FIG. 2 is a block diagram showing an example of a relationship between first data and second data according to the first embodiment.
FIG. 3 is a view showing an example of a data management table according to the first embodiment.
FIG. 4 is a view showing an example of a dirty state determination count table according to the first embodiment.

FIG. 3 is a view showing an example of a data management table according to this embodiment.

A data management table 11 is managed by, for example, the determination section 93 of the OS 9, and is stored in, for example, the volatile semiconductor memory 5.

The data management table 11 includes, in each entry, data identification information, and information on a last write access time to the data. By referring to the data management table 11, it is possible for the determination section 93 of the OS 9 to obtain an elapsed time from the last write access for each data.

FIG. 4 is a view showing an example of a dirty state determination count table according to this embodiment.

The dirty state determination count table 12 is managed by, for example, the determination section 93 of the OS 9, and is stored in, for example, the volatile semiconductor memory 5.

The dirty state determination count table 12 includes, in each entry, data identification information, and the number of times when write back of the data is not carried out although it is determined that data is in the dirty state after the last write back of the data. In other word, the dirty state determination count table 12 includes, in each entry, data identification information, and the number of times determined that the data is in the dirty state after the last write back. By referring to the dirty state determination count table 12, it is possible for the determination section 93 of the OS 9 to make a determination, whether the number of times determined that the data is in the dirty state after the last write back of the data exceeds a predetermined times or not, and execute write back of the date when it is determined to be exceeded.

Figure 5:
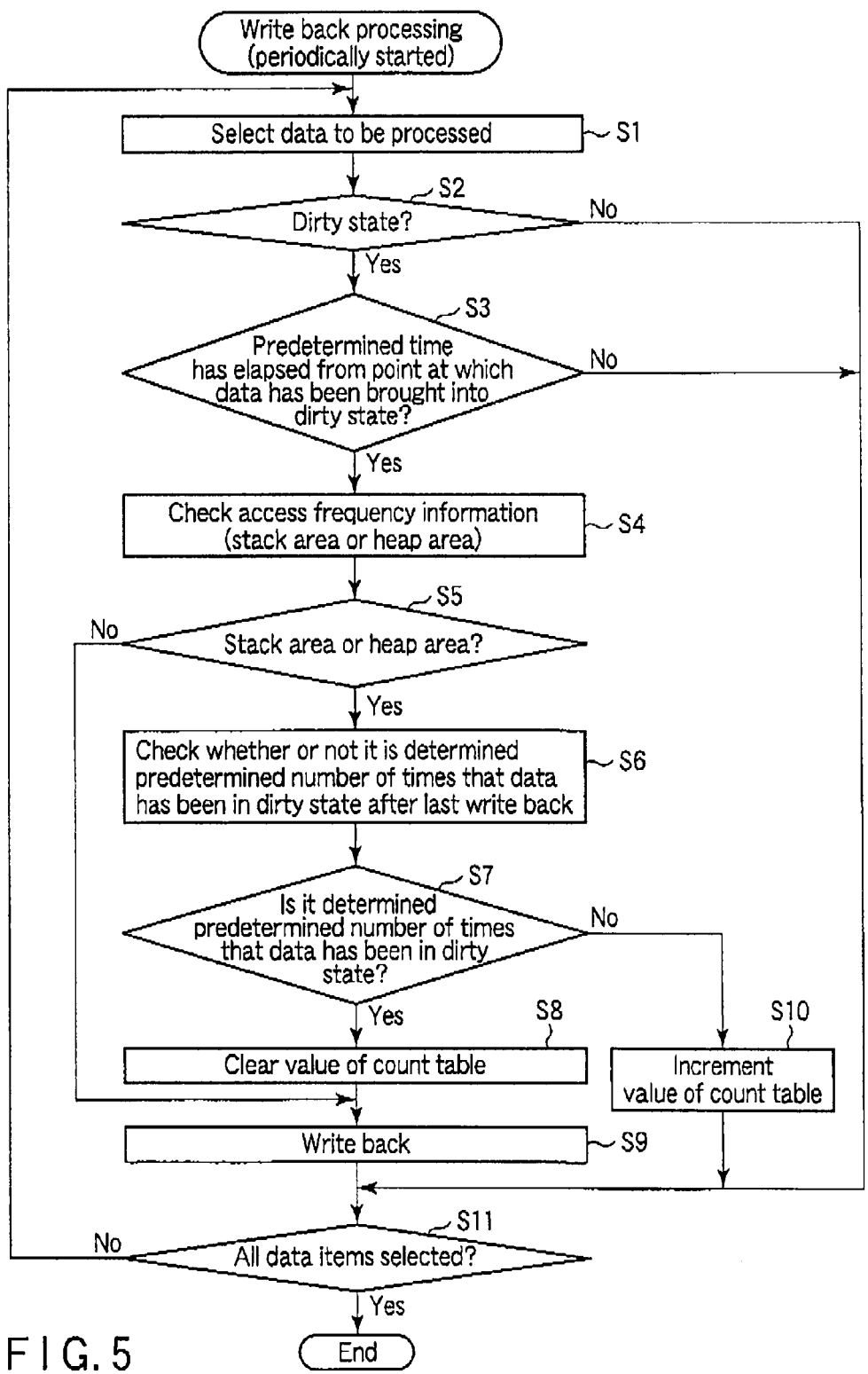
FIG. 5 is a flowchart showing an example of write back processing of the information processing device according to the first embodiment.

FIG. 5 is a flowchart showing an example of write back processing of the information processing device 1 according to this embodiment. FIG. 5 exemplifies write back processing of the data allocated in the stack area or the heap area.

The OS 9 starts write back processing, for example, with a predetermined period.

The OS 9 selects data to be processed (unprocessed data) from among data allocated to the volatile semiconductor memory 5 (step S1).

The inconsistency determination section 91 of the OS 9 determines whether or not the data to be processed is in the dirty state (step S2).

When the data to be processed is not in the dirty state, the write back processing shifts to step S11.

When the data to be processed is in the dirty state, the setting section 92 of the OS 9 determines whether or not a predetermined time is elapsed from a dirty state occurred time for the data to be processed (step S3).

When the predetermined time is not elapsed from the dirty state occurred time, the write back processing shifts to step S11.

When the predetermined time is elapsed from the dirty state occurred time, the setting section 92 of the OS 9 checks access frequency information indicating whether or not the data to be processed is data allocated in the stack area or the heap area, and the like (step S4).

When the data to be processed is not data allocated in the stack area or the heap area, the write back processing shifts to step S9, and when the data to be processed is data allocated in the stack area or the heap area, the write back processing shifts to step S6 (step S5).

When the data to be processed is data allocated in the stack area or the heap area, the determination section 93 of the OS 9 checks, on the basis of the dirty state determination count table 12, whether or not it is determined a predetermined number of times (for example, four times or the like) that the data to be processed allocated in the stack area or the heap area of the volatile semiconductor memory 5 is in the dirty state after the last write back (step S6). It should be noted that it is assumed that the predetermined number of times can be changed by the setting section 92 on the basis of the access frequency information and the like.

When it is determined the predetermined number of times that the data to be processed is in the dirty state after the last write back, the write back processing shifts to step S8, and when it is not determined the predetermined number of times that the data to be processed is in the dirty state after the last write back, the write back processing shifts to step S10 (step S7).

When it is determined the predetermined number of times that the data to be processed is in the dirty state after the last write back, the determination section 93 of the OS 9 clears the number of times of determination of the dirty states of the data to be processed after the last write back in the dirty state determination count table 12 (step S8), and furthermore, the write back section 94 of the OS 9 executes write back of the data to be processed from the volatile semiconductor memory 5 to the nonvolatile semiconductor memories 61 to 6n (step S9). It should be noted that the execution order of step S8 and step S9 may be reversed or may be executed in parallel. Thereafter, the processing shifts to step S11.

On the other hand, when it is not determined the predetermined number of times that the data to be processed is in the dirty state after the last write back, the determination section 93 of the OS 9 increments the number of times of determination of the dirty state after the last write back corresponding to the data to be processed in the dirty state determination count table 12 (step S10). Thereafter, the processing shifts to step S11.

Further, the OS 9 determines whether or not all the data are selected in step S1. When unselected data is still present in the volatile semiconductor memory 5, the write back processing returns to step S1. When all the data in the volatile semiconductor memory 5 are selected, the write back processing is terminated (step S11).

In this embodiment described above, it is possible to make the write back of data from the semiconductor memory used as the cache memory to the other semiconductor memories more efficient.

In this embodiment, the information processing device 1 controls the timing of the write back processing (synchronous processing) on the basis of the access frequency information corresponding to data. For example, in this embodiment, the time from the last write access to the execution of write back is changed with respect to data allocated in a specific data area, and the write back is executed at timing appropriate for the data area. Thereby, in this embodiment, it is possible to reduce the number of times of write back to the nonvolatile semiconductor memories 61 to 6n as compared with the existing write back processing.

Further, in this embodiment, it is possible to execute write back earlier than the existing write back processing. Thereby, when new data is transferred from the nonvolatile semiconductor memories 61 to 6n to the volatile semiconductor memory 5, it is possible to prevent data in the volatile semiconductor memory 5 from being written back to the nonvolatile semiconductor memories 61 to 6n, and reduce an overhead of load processing of data.

In this embodiment, it is explained that the nonvolatile semiconductor memories 61 to 6n are used as the main memory and the volatile semiconductor 5 is used as the cache memory. However, the nonvolatile semiconductor memories 61 to 6n may be used as an auxiliary memory, and the volatile semiconductor 5 may be used as the main memory. In this case, timing of write back from the volatile semiconductor 5 to the nonvolatile semiconductor memories 61 to 6n is controlled based on the access frequency information associated with data on the volatile semiconductor 5 as the main memory. In a second and third embodiments which will be explained below, the volatile semiconductor 5 and the nonvolatile semiconductor memories 61 to 6n may be the same as this embodiment.

Second Embodiment

In this embodiment, first to fourth modification examples will be described below as modification examples of the first embodiment.

In a first modification example, the write back processing carried out by the OS 9 explained in FIG. 5 is realized by the processing section 7 executing the software 8. The processing section 7 has the configuration independent of the processors P1 to P4.

Thereby, it is possible to prevent the load of the processors P1 to P4 from being increased. Further, processing may not be added to the OS 9.

Figure 6:
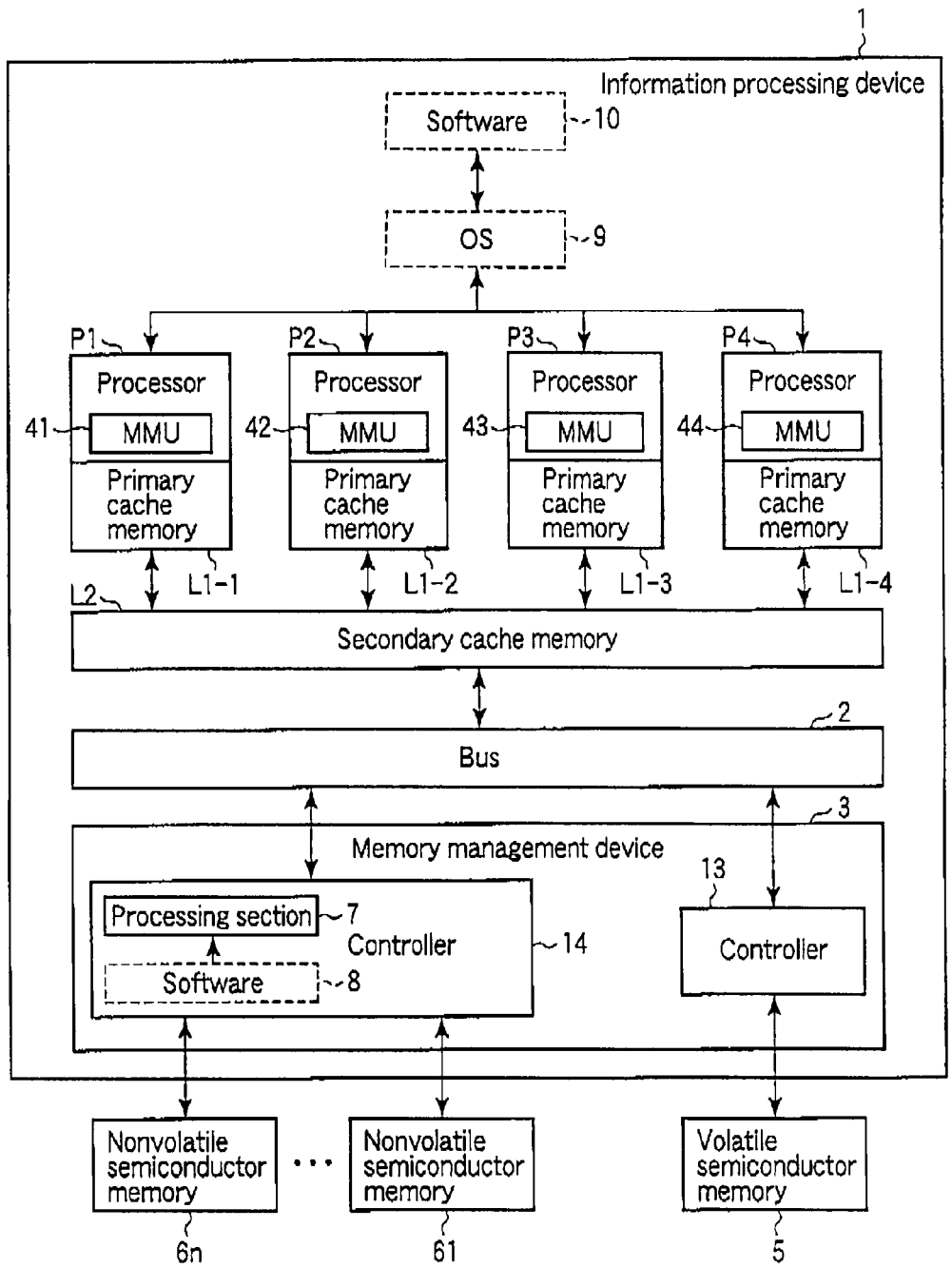
FIG. 6 is a block diagram showing an example of a configuration of an information processing device according to a second embodiment.

In a second modification example, the memory management device 3 may be provided with a controller 13 for the volatile semiconductor memory 5, and controller 14 for the nonvolatile semiconductor memories 61 to 6n as shown in FIG. 6.

In FIG. 6, the controller 13 controls various processing items such as a write access, read access, data erase, and the like associated with the volatile semiconductor memory 5. The controller 14 controls various processing items such as a write access, read access, data erase, and the like associated with the nonvolatile semiconductor memories 61 to 6n.

Data in the volatile semiconductor memory 5 is transferred to the nonvolatile semiconductor memories 61 to 6n via the controller 13, bus 2, and controller 14.

On the other hand, data in the nonvolatile semiconductor memories 61 to 6n is transferred to the volatile semiconductor memory 5 via the controller 14, bus 2, and controller 13.

Figure 7:
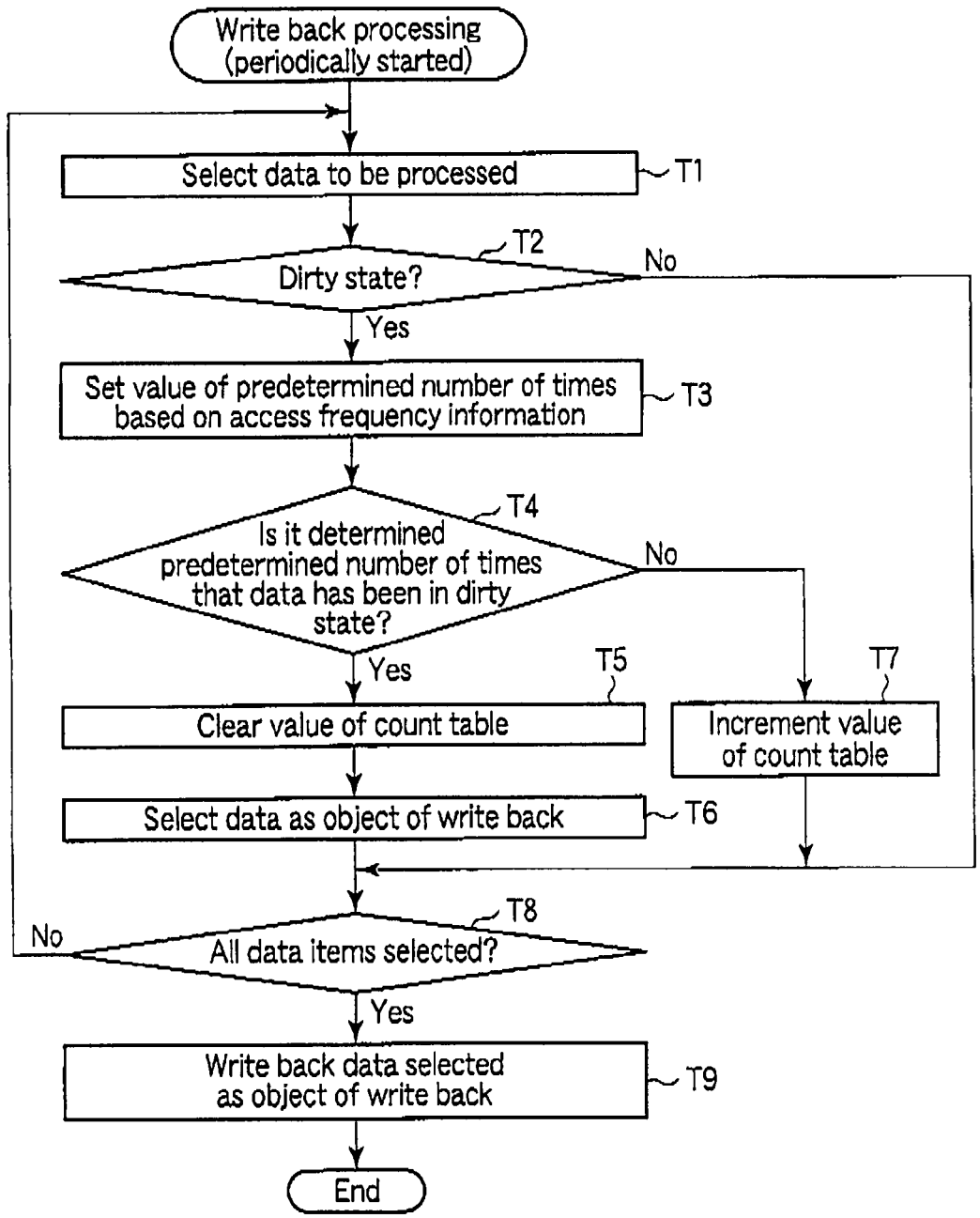
FIG. 7 is a flowchart showing an example of write back processing of the information processing device according to the second embodiment.

In a third modification example, write back processing is executed in accordance with the flowchart shown in FIG. 7. The write back processing of FIG. 7 differs from the write back processing of FIG. 5 in which determination and execution of write back are repeated with respect to each data in the volatile semiconductor memory 5, in determining whether or not write back is to be carried out for each data in the volatile semiconductor memory 5 and, after completion of determination for each data, executing write back for each data for which it is determined that write back is to be carried out.

In the write back processing of FIG. 7, first, the OS 9 selects data to be processed (step T1).

Write access to the data to be processed is occurred with respect to the period from the write back of a last time to a current time, and the inconsistency determination section 91 of the OS 9 determines whether or not the data to be processed is dirty information (step T2).

When the data to be processed is not in the dirty state, the write back processing shifts to step T8.

When the data to be processed is in the dirty state, the setting section 92 of the OS 9 determines whether write back of the data to be processed is to be made earlier, is to be made later or is to be made unchanged on the basis of the access frequency information, and sets a predetermined number of times. In other word, the setting section 92 determines the timing of write back based on the access frequency information (step T3).

The determination section 93 of the OS 9 determines whether or not it is determined the predetermined number of times that the data to be processed is in the dirty state after the last write back on the basis of the dirty state determination count table 12 (step T4).

When it is determined the predetermined number of times that the data to be processed is in the dirty state after the last write back, the write back processing shifts to step T5, and when it is not determined the predetermined number of times that the data to be processed is in the dirty state after the last write back, the write back processing shifts to step T7.

When it is determined the predetermined number of times that the data to be processed is in the dirty state after the last write back, the determination section 93 of the OS 9 clears the number of times of determination of the dirty states of the data to be processed after the last write back in the dirty state determination count table 12 (step T5), and furthermore, determination section 93 of the OS 9 selects the data to be processed as an object to be written back (step T6). It should be noted that the execution order of step T5 and step T6 may be reversed or may be executed in parallel.

On the other hand, when it is not determined the predetermined number of times that the data to be processed is in the dirty state after the last write back, the OS 9 increments the number of times of determination of the dirty state after the last write back corresponding to the data to be processed in the dirty state determination count table 12 (step T7).

Further, the write back section 94 of the OS 9 determines whether or not all the data are selected in step T1 (step T8).

When unselected data is still present in the volatile semiconductor memory 5, the write back processing returns to step T1.

When all the data in the volatile semiconductor memory 5 are selected, the write back section 94 of the OS 9 executes write back of data selected as an object to be written back (step T9), and terminates the write back processing.

As described above, the write back processing can be variously optimized to be applied.

It should be noted that regarding FIG. 7, as will be described in the fourth embodiment to be described later, the processing section 7 executing the software 8 may be the processing main body in place of the OS 9.

In the fourth modification example, the OS 9 may determine whether or not write back is to be executed on the basis of a write count table 15 as shown in FIG. 8.

The write count table 15 is stored in, for example, the volatile semiconductor memory 5. The write count table 15 includes, in each entry, data identification information, and the number of times of write access to the volatile semiconductor memory 5 after the last write back of the data.

The OS 9 manages, for each data stored in the volatile semiconductor memory 5, the number of times of write access after the last write back of the data by using the write count table 15.

Further, the OS 9 sets the predetermined number of times of each data on the basis of the access frequency information, and executes write back for each data when the number of times of write access after the last write back of the data is more than the set predetermined number of times.

As described above, various criteria can be used for determination made to make write back later or earlier.

Third Embodiment

In this embodiment, an information processing device which is a modification example of the first and second embodiments described above, and is provided with a profile section will be described below.

The access frequency information described in the above-mentioned first embodiment is information determined (predicted) in advance on the basis of a characteristic of data. When it is determined whether or not write back is to be executed on the basis of access frequency information, differences between information processing devices may not be reflected. The speed of the processor itself, operation frequency or capacity of the primary cache memory of the processor, and operation frequency or capacity of the common secondary cache memory may differ between the information processing devices. The access pattern for the volatile semiconductor memory 5 may change in accordance with such differences between the information processing devices.

Thus, in this embodiment, for example, the information processing device 1 of the first embodiment is further provided with a profile section which collects access frequency information. The profile section is constituted of hardware. Further, in this embodiment, the access frequency information described in the first embodiment is corrected to thereby realize write back processing of the higher degree of accuracy.

The access frequency information described in the first embodiment is information determined in advance on the basis of a data characteristic, and is hereinafter referred to as "static access frequency information". The access frequency information to be described in this embodiment, and collected by the profile section is hereinafter referred to simply as "access frequency information".

Further, in this embodiment, collection of access frequency information is carried out by the profile section constituted of hardware, and hence collection in units of fine times is enabled without causing degradation of the system performance unlike the collection carried out by software.

Figure 9:
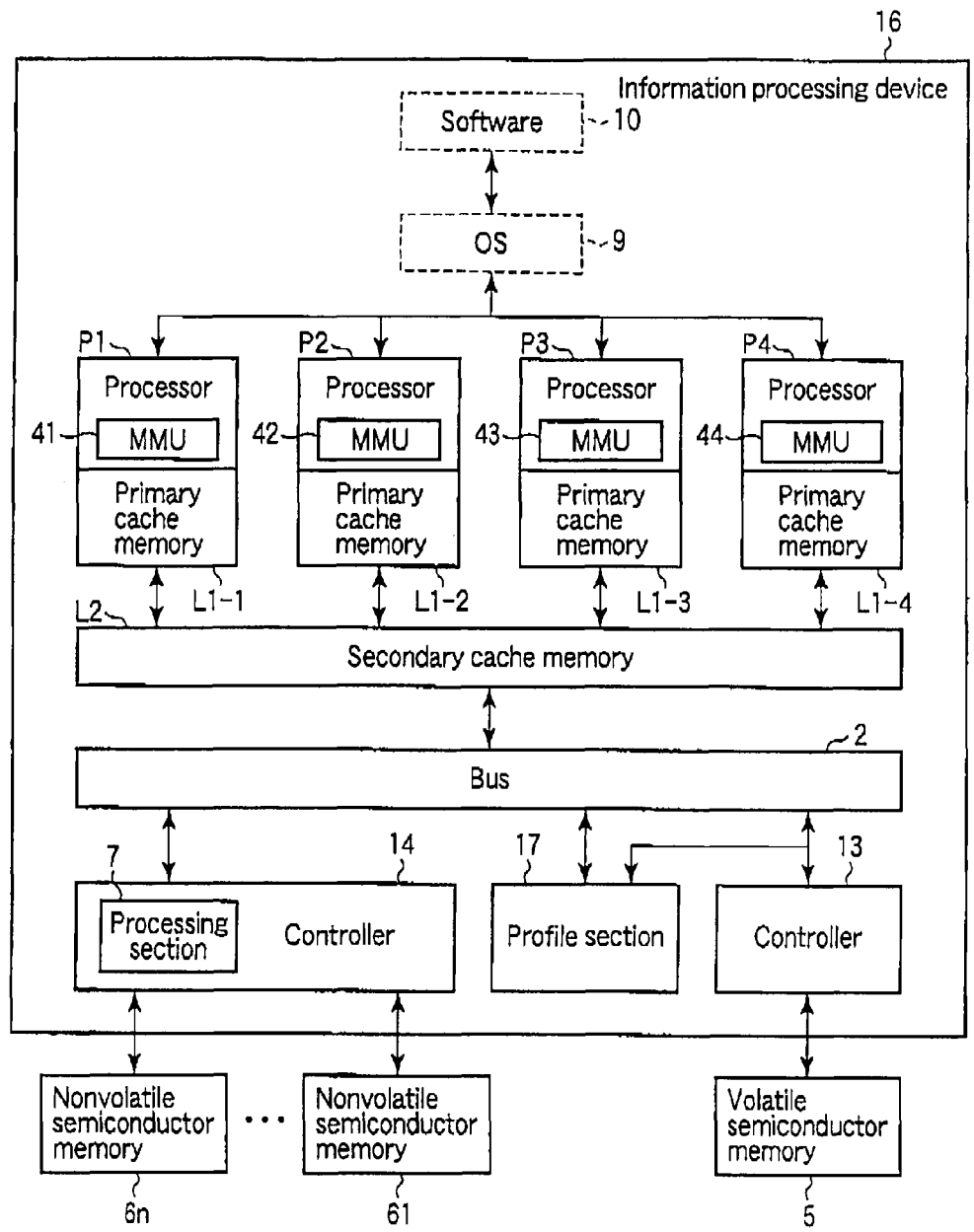
FIG. 9 is a block diagram showing an example of a configuration of an information processing device according to a third embodiment.

FIG. 9 is a block diagram showing a configuration example of an information processing device according to this embodiment.

In the information processing device 16 of FIG. 9, a profile section 17 is further provided to the configuration of FIG. 6. The profile section 17 is adjacent to the controller 13.

The profile section 17 monitors information (access request signal) about access to the controller 13, collects information (for example, access history information or the like) about the frequency of access to the volatile semiconductor memory 5, and stores the collected information items as the access frequency information. The processors P1 to P4 and processing section 7 can access the profile section 17 via the bus 2, and read the access frequency information collected by the profile section 17.

As the information collected by the profile section 17, various information items are conceivable and, furthermore, as the embodiment expressing the information, various configurations are conceivable. In this embodiment, the profile section 17 monitors intervals between operations of write access to the data area.

Figure 10:
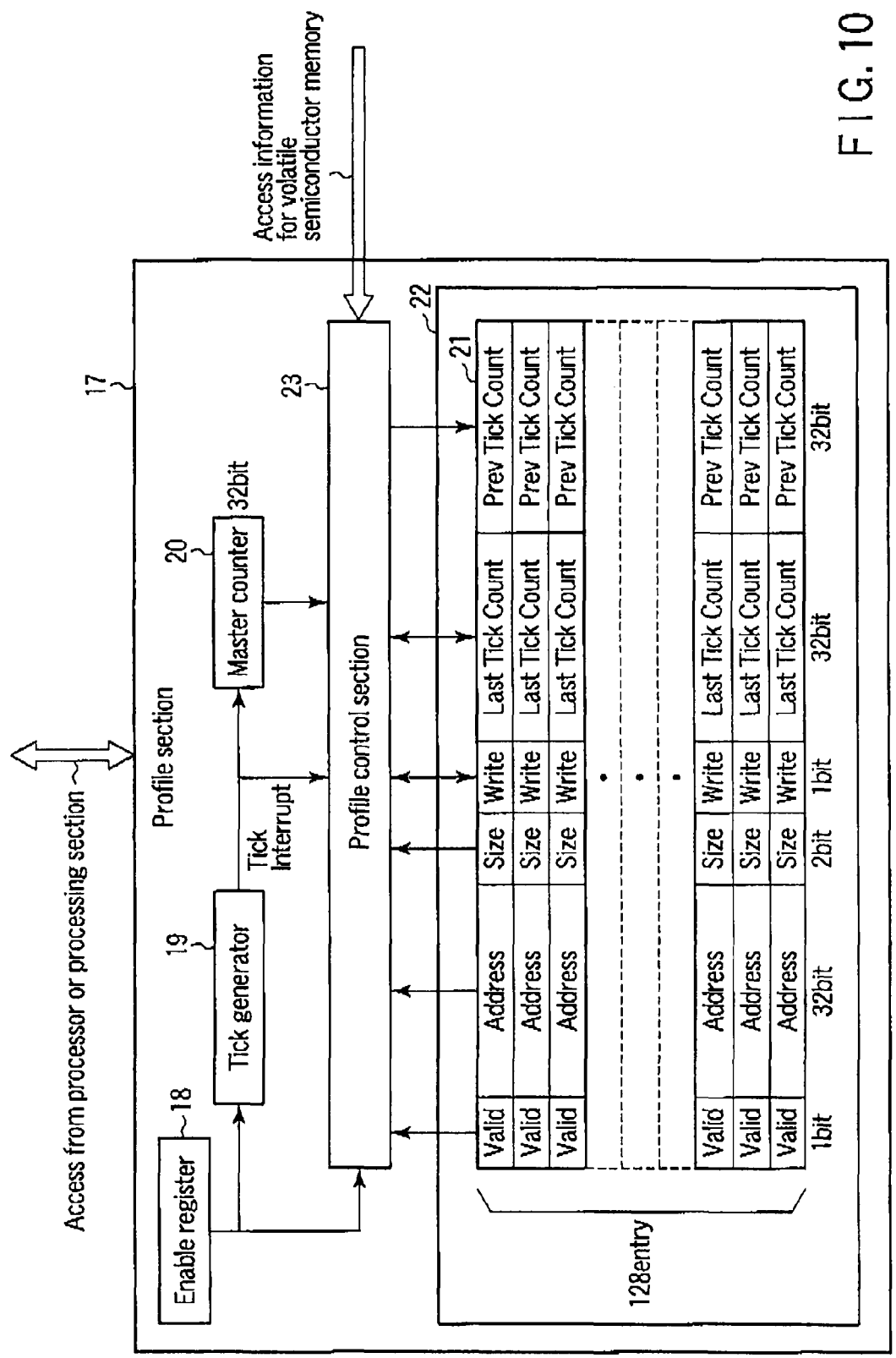
FIG. 10 is a block diagram showing an example of a profile section according to the third embodiment.

FIG. 10 is a block diagram showing an example of the profile section 17 according to this embodiment.

The profile section 17 is provided with an enable register 18, tick generator 19, master counter 20, memory section 22 storing a profile table 21, and profile control section 23.

The enable register 18 records a flag indicating whether or not collection of access frequency information is to be carried out. For example, when 1 is set in the enable register 18, the operation of the profile section 17 is started, and generation of ticks at predetermined intervals, and collection of information about access to the volatile semiconductor memory 5 are started.

The tick generator 19 generates, in order to update access frequency information at predetermined intervals, an update command at the predetermined intervals. In this embodiment, each time a tick is generated, the access frequency information is updated. As described above, by employing the concept of a tick, it is possible, even when access occurs in a concentrated manner at certain tick intervals, to count the concentrated access as access of one unit. By making the interval between ticks a period shorter than an interval between write back checks carried out by the OS 9, the significance of generating ticks by hardware is created. The interval between ticks can be set by software (hereinafter simply referred to as "software") such as the OS 9, software 8 or the like.

The master counter 20 is a 32-bit counter which increments a value of the master counter 20 by 1 each time a tick is generated. The value of the master counter 20 can be read by the software.

The profile table 21 is a main body of the access frequency information collected by the profile section 17. In this embodiment, the number of entries of the profile table 21 is 128. Read/write can be carried out for all the fields of the profile table 21 by the software.

Each entry of the profile table 21 includes a valid/invalid bit, address information, size information, inter-tick write detection information, last access tick time, and previous last access tick time. In FIG. 10, the valid/invalid bit is denoted by "Valid". The address information is denoted by "Address". The size information is denoted by "Size". The inter-tick write detection information is denoted by "Write". The last access tick time is denoted by "Last Tick Count". The previous last access tick time is denoted by "Prey Tick Count".

The valid/invalid bit (1 bit) indicates whether an entry is valid or invalid. When the valid/invalid bit is 1, the entry includes collected access frequency information.

The address information (32-bit length) is information used as a criterion for specifying an address associated with the access frequency information indicated included in the entry. The address information is set by, for example, the software. The bit length of the address information is identical with an address range of the volatile semiconductor memory 5 and, in this embodiment, may be set at 32 bits assuming that the capacity of the volatile semiconductor memory 5 is 4 Gbytes. The bit length of the address information changes depending on the used processor, and capacity of the volatile semiconductor memory.

The size information (2-bit length) is information used to specify a range of the access frequency information from the address information managed by the entry. The size information is set by, for example the software.

For example, when 0 is set in the size information, the entry manages access frequency information associated with the area of address information+4 Kbytes.

For example, when 1 is set in the size information, the entry manages access frequency information associated with the area of address information+16 Kbytes.

For example, when 2 is set in the size information, the entry manages access frequency information associated with the area of address information+1 Mbytes.

For example, when 3 is set in the size information, the entry manages access frequency information associated with the area of address information+4 Mbytes.

The inter-tick write detection information (1 bit) is basically set or reset by hardware. When write access occurs even once in an area corresponding to the entry in the tick interval, 1 is set in the inter-tick write detection information. At the time of completion of tick processing, 0 is set in the inter-tick write detection information. When no write access occurs in the area corresponding to the entry in the tick interval, 0 is set in the inter-tick write detection information.

The last access tick time (32 bits) is basically updated by hardware. When an update command is issued by the tick generator 19, if 1 is set in the inter-tick write detection information, the value of the master counter 20 is copied to the last access tick time.

The previous last access tick time (32 bits) is basically updated by hardware. When an update command is issued by the tick generator 19, if 1 is set in the inter-tick write detection information, the value of the last access tick time before being updated is copied to the previous last access tick time.

The profile control section 23 receives a tick (interrupt) from the tick generator 19, and access information about the volatile semiconductor memory 5, and updates contents of the profile table 21.

When the profile section 17 according to this embodiment is used, the following initialization is executed by the software.

First, the tick interval is determined as processing common to all the entries of the profile table 21. In this embodiment, it is assumed that the tick interval is set in such a manner that a tick is generated once a microsecond.

Secondly, address information used as a criterion, and a range are respectively set in the address information, and size information of an entry of the profile table 21, and 1 is set in the valid/invalid bit, for each data area of the volatile semiconductor memory 5 of which measurement of access frequency information is required. In other fields in the entry, 0 is set initially.

Thirdly, the value of the master counter is reset to 0.

Fourthly, 1 is set in the enable register 18.

After the above-mentioned initialization is completed, the operation of the profile section 17 is started, profile control section 23 determines whether or not access to the volatile semiconductor memory 5 occurs, for example, for each microsecond and, when access occurs, preserves the last (this time) access tick time, and previous last access tick time in the entry of the profile table 21.

Figure 11:
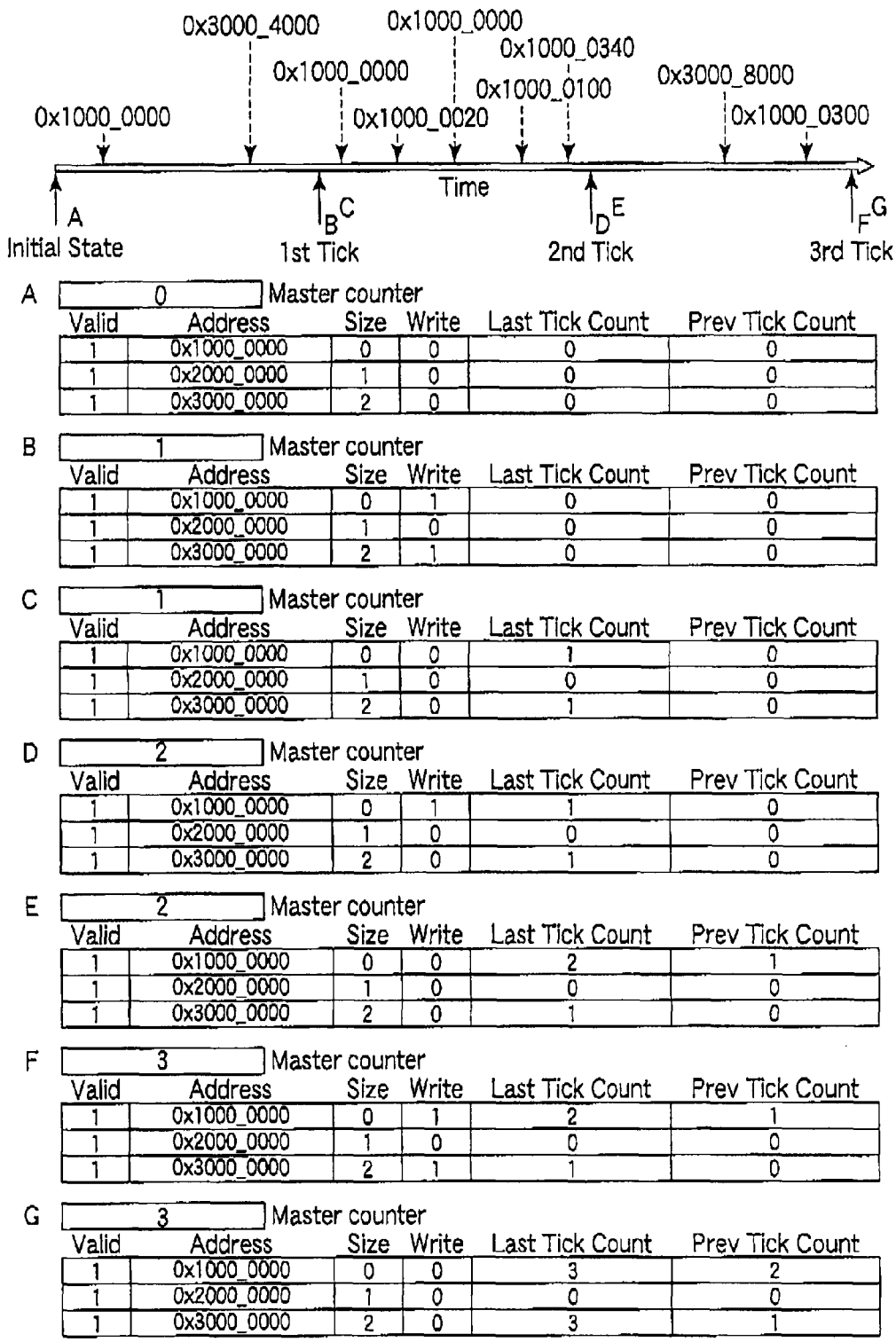
FIG. 11 is a view showing an example of a sequence of occurrence states of write access, and changes in the profile table of a case where the profile section is operated under a condition of the sequence.

FIG. 11 is a view showing an example of a sequence of occurrence states of write access, and changes in the profile table 21 of a case where the profile section 17 is operated under a condition of the sequence.

In FIG. 11, for example, 1 tick is 1 microsecond, the checking range of access is three areas including addresses "from 0x1000_0000 to 0x1000_0FFF" (4 Kbytes), addresses "from 0x2000_0000 to 0x2000_3FFF" (16 Kbytes), and addresses "from 0x3000_0000 to 0x300F_FFFF" (1 Mbytes).

Each of the broken lines and their numerals in the sequence diagram of FIG. 11 indicate that write access to the address indicated by the numeral is occurred.

In the changes in the profile table 21 of FIG. 11, the state of the profile table 21 at timing A immediately after completion of the initialization, states of the profile table 21 at timing B, D, and F immediately after increment of the value of the master counter 20, and values of the profile table 21 at timing C, E, and G immediately after execution of processing based on the occurrence of the tick, are shown.

At timing A, the state where initialization of the profile section 17 is completed by the software is represented. In the fields other than the set field, 0 is set.

At timing B, access to the area to which the address "0x1000_0000" belongs, and area to which the address "0x3000_0000" belongs is occurred at the tick intervals, and hence 1 is set in the inter-tick write detection information of the entries corresponding to these areas.

At timing C after executing the processing for timing B, a value of the last access tick time at that time is saved in the previous last access tick time, and a value of the master counter at that time is saved in the last access tick time, in the entry in which 1 is set in the inter-tick write detection information. Accordingly, values in the entry in the first line, and entry in the third line are rewritten. Thereafter, 0 is set in all the inter-tick write detection information items.

At timing D, write access to only the area to which the address "0x1000_0000" belongs is occurred at the tick intervals. Accordingly, 1 is set in the inter-tick write detection information in the entry in only the first line corresponding to the area.

At timing E after executing the processing for timing D, the value "1" of the last access tick time at that time is saved in the previous last access tick time, and value "2" of the master counter at that time is saved in the last access tick time, in the entry in the first line in which 1 is set in the inter-tick write detection information. Thereafter, 0 is set in all the inter-tick write detection information items.

At timing F, like at timing B, access to the area to which the address "0x1000_0000" belongs, and area to which the address "0x3000_0000" belongs is occurred at the tick intervals. Accordingly, 1 is set in the inter-tick write detection information of each of the entries in the first line and third line corresponding to these areas.

At timing G after executing the processing for timing F, the value "2" of the last access tick time at that time is saved in the previous last access tick time, and value "3" of the master counter at that time is saved in the last access tick time, in the entry in the first line in which 1 is set in the inter-tick write detection information. Furthermore, the value "1" of the last access tick time at that time is saved in the previous last access tick time, and value "3" of the master counter at that time is saved in the last access tick time, in the entry in the third line in which 1 is set in the inter-tick write detection information. Thereafter, 0 is set in all the inter-tick write detection information items.

The profile section 17 advances the operation of the profile section 17 in the manner shown in FIG. 11. The software refers to, at appropriate timing, the value of the master counter 20 at the instant, and values of the previous last access tick time, and last access tick time of each entry. Thereby, for data area to be checked of the access frequency information, it is possible to calculate the interval between the current time and last write access, and interval between the current time and previous last write access (intervals for accesses of the last two times). Further, it is possible to determine whether or not write back is to be carried out on the basis of these intervals.

For example, when the value of the interval between the current time and previous last write access is large, the software determines that the data area is a data area in which the write interval is long, and delays occurrence of write back of data in accordance with the update interval of the data area.

Further, it is also possible for the software to utilize the access frequency information together with the static access frequency information described in the first embodiment. When it is desired to attach greater importance to the static access frequency information described in the first embodiment than the access frequency information of this embodiment, the software may neglect the access frequency information of this embodiment collected by the profile section 17 to execute the write back processing. By flexibly combining the static access frequency information of the first embodiment, and access frequency information of this embodiment based on the hardware with each other, it is possible to execute write back at optimum timing.

Further, the software may determine data area to be collected by the profile section 17 based on the static access frequency information of the first embodiment.

It should be noted that in this embodiment, the master counter 20 has a 32-bit configuration, and tick interval is 1 microsecond. Accordingly, the maximum retraceable past time becomes $2^{32} \times 1$ microsecond=approx. 4295 seconds=approx. 72 min. That is, after about 72 minutes, the value of the master counter 20 returns to 0, and counting is started again from 1. That is, after an elapse of about 72 minutes, a relationship between the previous last access tick time and last access tick time registered in the profile table 21, and actual access time become inconsistent with each other. Accordingly, the software executes analysis of the access frequency by taking the possibility of the master counter 20 returning to 0 into consideration, or stops the profile section 17 once 72 minutes to carry out setting again.

In this embodiment, the profile section 17 is provided as hardware. Accordingly, an upper limit exists in a collectible information amount in the profile section 17. For example, it is assumed that the profile section 17 manages access to a 2 Gbytes memory space in units of 4 Kbytes. In this case, it is necessary for the profile section 17 to manage 2 Gbytes/4 Kbytes=512,000 entries. Further, when an information amount of 16 bytes per entry is needed, the profile section 17 requires an information amount of 512K×16 bytes=8 Mbytes. Although a memory capacity of 8 Mbytes is an implementable size for a current semiconductor device, a cost is high.

Further, not all information processing devices provide the 2 Gbytes memory space. The memory capacity of the provided memory space differs between the information processing devices. Accordingly, the number of entries required by the profile section 17 differs between the information processing devices.

Accordingly, in this embodiment, the profile section 17 collects access frequency information only from areas specified by the software as described above.

However, as the profile section 17, it is conceivable that the profile section 17 carries out various types of control in order to collect the access frequency information from areas specified by the software, and efficiently collect the access frequency information. For example, when a data amount of the collected access frequency information exceeds the data amount that can be stored in the memory section 22 of the profile section 17 (when the access frequency information overflows the profile section 17), the profile control section 23 of the profile section 17 outputs part of the collected access frequency information to the volatile semiconductor memory 5. In the control of the profile control section 23, the area and band width of the volatile semiconductor memory 5 are used. Further, for example, when the data amount of the collected access frequency information exceeds the data amount that can be stored in the memory section 22, the profile control section 23 of the profile section 17 erases old access frequency information from the memory section 22 with the latest access frequency information left unerased in the memory section 22.

It should be noted that the profile section 17 according to this embodiment is an example and, essentially, by providing a contrivance that enables acquisition of an update interval of data, the configuration can be variously changed. In this embodiment, although the write accesses interval is calculated based on the value of the master counter 20, value of the previous last access tick time of the profile table 21, and value of the last access tick time of the profile table 21, it may be made possible to preserve the access tick time older than the previous last access tick time by changing the configuration of the profile table 21, and calculate the write access interval by using those values. Thereby, it is possible to improve the estimation accuracy of the interval between write access events. Further, the interval between write access events may be calculated by making the inter-tick write detection information multi-bit to shift the value each time a tick occurs, and storing presence/absence of occurrence of write access, and occurrence time (tick number), without using the value of the master counter 20. As described above, implementation of the profile section 17 can be variously changed to be applied.

Figure 12:
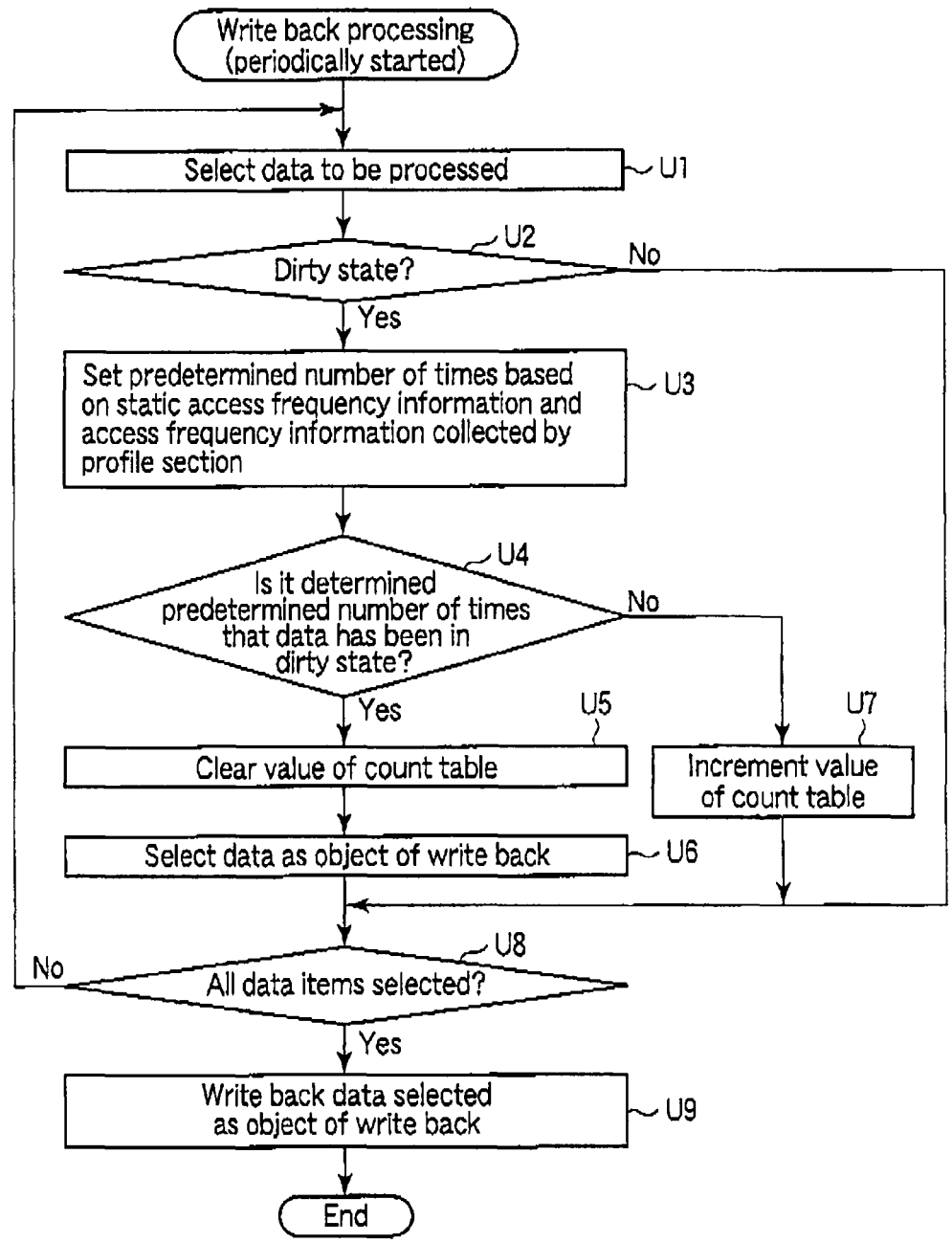
FIG. 12 is a flowchart showing an example of write back processing of the information processing device according to the third embodiment.

FIG. 12 is a flowchart showing an example of write back processing of the information processing device 16 according to this embodiment.

In FIG. 12, steps U1, U2, and U4 to U9 are identical with steps T1, T2, and T4 to T9 of FIG. 7.

In this embodiment, in step U3, it is determined whether the timing of execution of write back is desired to be made earlier, to be made later or not to be changed on the basis of the static access frequency information of the first embodiment, and the access frequency information collected by the profile section 17, and a predetermined number of times is set.

By the operation of the profile section 17 described above, the software such as the OS 9 executed by the processors P1 to P4, and software 8, and the like executed by the processing section 7 can recognize the interval between write accesses to various data areas in the information processing device 16. Accordingly, in this embodiment, it is possible to correct the determination of the time for write back processing to be carried out by using the static access frequency information of the first embodiment.

In this embodiment described above, the actual access frequency information (for example, the lastly accessed time information) in the information processing device 16 is utilized in addition to the static access frequency information. Further, it is possible to cope with, in accordance with the deviation of the actual access frequency, the number of times of access to the main memory differing between information processing devices, and deviation in access frequency in the same type of data area, both of which cannot be fully coped with by only the static access frequency information, and change the time to the execution of write back.

Further, in this embodiment, it is possible to carry out write back at timing earlier than the specified predetermined time and, as a result, improve the performance of the information processing device 16.

It should be noted that, the information processing device 16 according to this embodiment can be variously changed.

Figure 13:
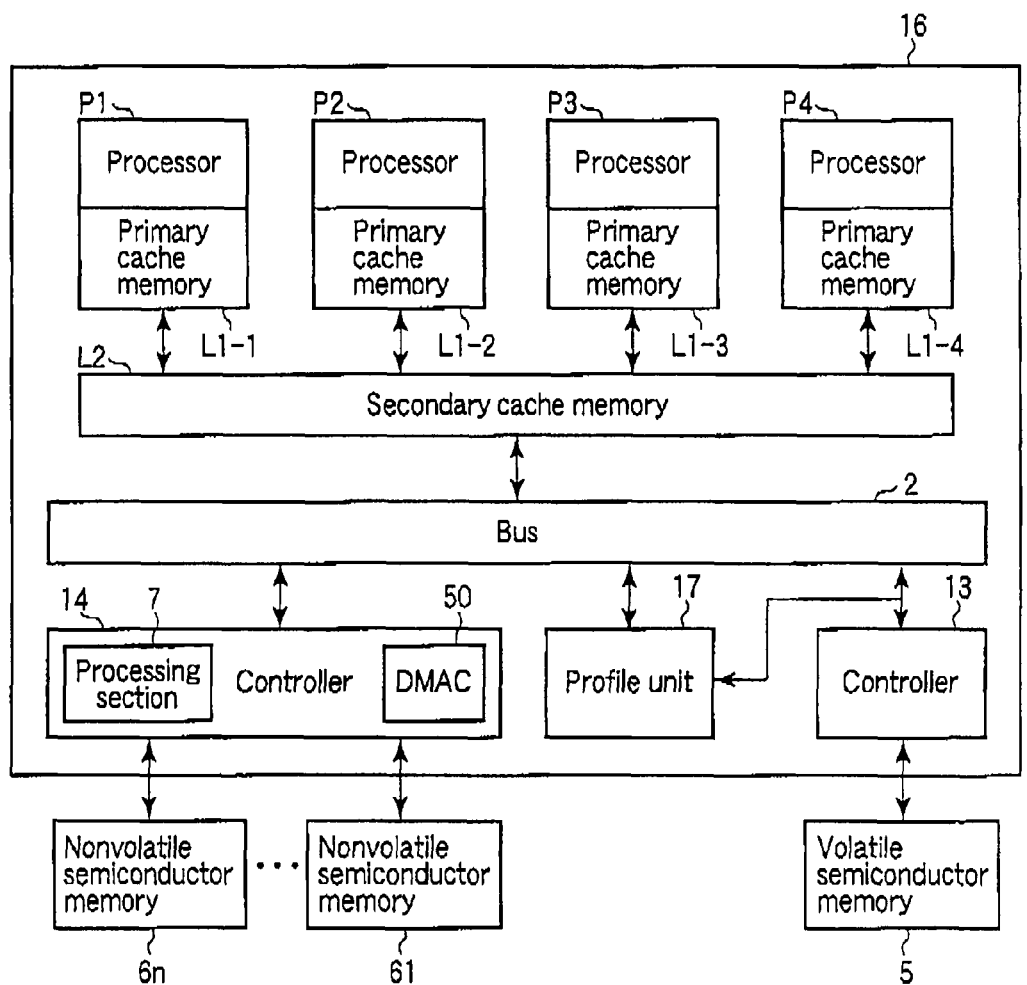
FIG. 13 is a block diagram showing a first modification example of the information processing device according to the third embodiment.

For example, as shown in FIG. 13, the controller 14 may be provided with a Direct Memory Access Controller (DMAC) 50. The DMAC 50 carries out data transfer between the volatile semiconductor memory 5 and nonvolatile semiconductor memories 61 to 6n. In the configuration of FIG. 13, it is possible to enhance an independence of the profile section 17.

For example, as shown in FIG. 14, the profile section 17 may be provided in the controller 13. In the configuration of FIG. 14, it is possible to add the profile section 17 without changing the structure of the bus 2 in the information processing device 16.

For example, as shown in FIG. 15, the profile section 17 may be provided in the secondary cache memory L2. As described above, by incorporating the profile section 17 in the secondary cache memory L2, it is possible to check only access from the processors P1 to P4, and collect access frequency information about access from the processors P1 to P4.

For example, as shown in FIG. 16, the profile section 17 may be provided in the memory management device 3. In the configuration of FIG. 16, it is possible to add the profile section 17 without changing the structure of the bus 2 in the information processing device 16.

Fourth Embodiment

In the first embodiment described previously, although write back processing is executed by the OS 9, in this embodiment, a case where write back processing is executed by a memory management device 3 will be described below in detail.

Further, in this embodiment, coloring information is used as the access frequency information.

Figure 17:
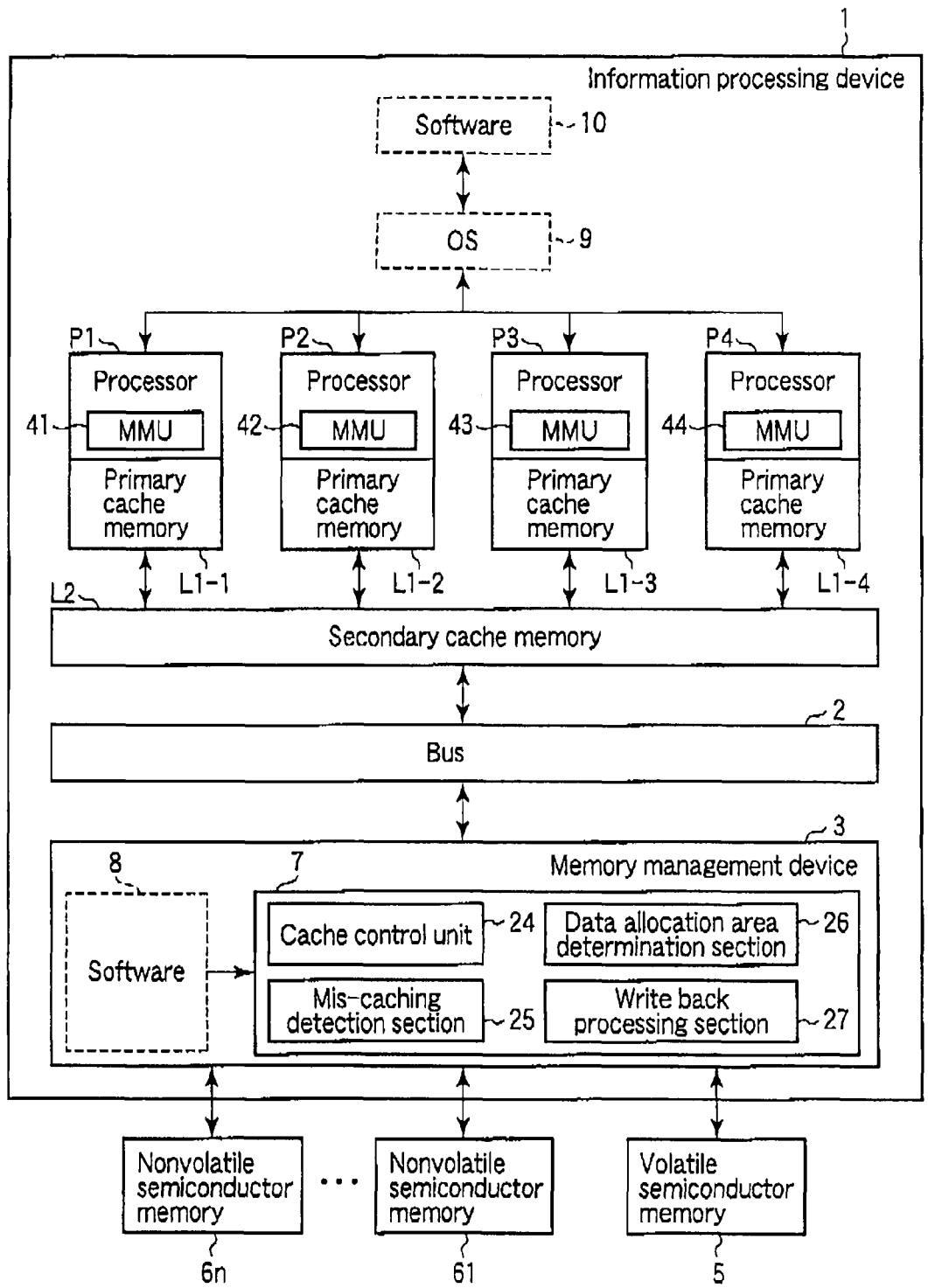
FIG. 17 is a block diagram showing an example of a configuration of an information processing device according to a fourth embodiment.

FIG. 17 is a block diagram showing a configuration example of an information processing device according to this embodiment.

In this embodiment, the processing section 7 executes the software 8 to thereby realize a cache control section 24, mis-caching detection section 25, data allocation area determination section 26, and write back processing section 27.

In this embodiment, each of nonvolatile semiconductor memories 61 to 6n may be provided with a first memory, and second memory. The first memory has a larger access-enabled upper limit number of times than the second memory. Here, attention should be paid to that the access-enabled upper limit number of times implies an expected value which is statistically presumed, and does not mean that the relationship is always guaranteed.

It is assumed that the first memory included in each of the nonvolatile semiconductor memories 61 to 6n is, for example, a NAND flash memory of a Single Level Cell (SLC). It is assumed that the second memory included in each of the nonvolatile semiconductor memories 61 to 6n is, for example, a NAND flash memory of a Multi Level Cell (MLC).

The SLC is higher in reading/writing speed, higher in reliability, and higher in durability than the MLC. However, the SLC is higher in bit cost than the MLC, and is not suitable for enhancement of capacity. On the other hand, the MLC is lower in reading/writing speed, lower in reliability, and lower in durability than the SLC. However, the MLC is lower in bit cost than the SLC, and is suitable for enhancement of capacity.

It should be noted that the reliability implies the degree of unlikelihood of missing data occurrence in the case where data is read from the memory. Further, that durability is high implies that the access-enabled upper limit number of times is large, and that durability is low implies that the access-enabled upper limit number of times is small.

In this embodiment, although each of the nonvolatile semiconductor memories 61 to 6n is described as a NAND flash memory, the nonvolatile semiconductor memory 61 to 6n is not limited to the NAND flash memory, and may be other types of flash memories such as a NOR flash memory, Phase change memory (FRAM), Resistive Random Access Memory (ReRAM) or the like.

In this embodiment, although the nonvolatile semiconductor memory 61 to 6n includes the SLC NAND flash memory and MLC NAND flash memory, the nonvolatile semiconductor memory 61 to 6n may include, for example, an MLC NAND flash memory of 2 bits/cell, and MLC NAND flash memory of 3 bits/cell.

Further, the MLC may be employed as the second memory, and an MLC that can utilize a pseudo-SLC mode in which only a lower page of the MLC is used to carry out data write may be used as the first memory. In this case, it is possible to constitute the first memory and second memory by using only common chips, this being advantageous in terms of manufacturing cost.

In this embodiment, the nonvolatile semiconductor memories 61 to 6n are used as a main memory. In the case where the nonvolatile semiconductor memories 61 to 6n are utilized as the main memory, the frequency of access to the nonvolatile semiconductor memories 61 to 6n becomes higher, and the life of the nonvolatile semiconductor memories 61 to 6n becomes shorter than the case where the nonvolatile semiconductor memories 61 to 6n are utilized as a conventional secondary memory (for example, a Solid State Drive (SSD) or the like). In this embodiment, protraction of the life of the nonvolatile semiconductor memories 61 to 6n is realized by managing the data allocation for the nonvolatile semiconductor memories 61 to 6n, and volatile semiconductor memory 5.

The memory management device 3 controls, for example, read, write, and erase carried out by the processors P1 to P4 with respect to the volatile semiconductor memory 5 and nonvolatile semiconductor memories 61 to 6n.

It should be noted that the memory management device 3 may also be configured to be provided in the processors P1 to P4, and control read, write, and erase carried out by the processors P1 to P4 with respect to the volatile semiconductor memory 5 and nonvolatile semiconductor memories 61 to 6n. In this embodiment, the data size of data to be written to or read from the volatile semiconductor memory 5 and nonvolatile semiconductor memories 61 to 6n is, for example, a page size, and erase size is a block size.

Each of the MMUs 41 to 44 of the processors P1 to P4 is provided with various functions such as a function of address translation from/to a virtual address to/from a physical address.

Although the various processing operations of the memory management device 3 are executed by the software 8, the processing operations may also be executed by hardware. Further, the processing operations of the memory management device 3 may also be carried out by sharing of burdens between the memory management device 3 and software 8.

The volatile semiconductor memory 5 is used as a cache memory of the nonvolatile semiconductor memories 61 to 6n.

The software 10 or the OS 9 executes processing of data while accessing the primary cache memories L1-1 to L1-4, and secondary cache memory L2. When data to be processed is not present in the primary cache memories L1-1 to L1-4, and secondary cache memory L2 (mis-caching in the primary cache memories L1-1 to L1-4, and secondary cache memory L2), processing data is read from the volatile semiconductor memory 5 or the nonvolatile semiconductor memories 61 to 6n. When the processing data is not present in the volatile semiconductor memory 5, mis-caching (mis-caching in the volatile semiconductor memory 5) occurs. As will be described later, mis-caching in the volatile semiconductor memory 5 is detected by the mis-caching detection section 25.

The cache control section 24 controls data cache from the nonvolatile semiconductor memories 61 to 6n to the volatile semiconductor memory 5. For example, data to be accessed by the software 10 or the OS 9 is cached from the nonvolatile semiconductor memories 61 to 6n to the volatile semiconductor memory 5. Thereby, it becomes possible for the software 10 or the OS 9 to read data from the volatile semiconductor memory 5 which can be accessed at higher speed than the nonvolatile semiconductor memories 61 to 6n, and the speed of access to data is enhanced.

The mis-caching detection section 25 detects mis-caching in the volatile semiconductor memory 5. As described previously, although the cache control unit 24 caches data accessed by the software 10 or the OS 9 to the volatile semiconductor memory 5, when the data accessed by the software 10 or the OS 9 is not cached to the volatile semiconductor memory 5, mis-caching occurs.

In the case or the like where data is newly produced in the software 10 or the OS 9, the data allocation area determination section 26 determines an allocation area (write area) of the data. The data allocation area determination section 26 determines an allocation area in accordance with the access frequency of the data by selection from the volatile semiconductor memory 5, and the SLC NAND flash memory and MLC NAND flash memory of the nonvolatile semiconductor memories 61 to 6n.

The write back processing section 27 executes the write back processing explained in the first embodiment or the second embodiment described previously, and is provided with, for example, the inconsistency determination section 91, setting section 92, determination section 93, and write back section 94.

In this embodiment, the wear leveling, and write back processing are executed by using coloring information including the number of times of read, number of times of write, read frequency, write frequency, and the like associated with each data. The coloring information associated with each data is produced by, for example, the OS 9.

When data is newly produced in the processors P1 to P4, the data allocation area determination section 26 determines an allocation area (write area) of the data. The data allocation area determination section 26 determines the allocation area on the basis of the coloring information by selection from the volatile semiconductor memory 5, and the SLC NAND flash memory and MLC NAND flash memory of the nonvolatile semiconductor memories 61 to 6n. Details of the coloring information will be described later.

The write back processing section 27 determines whether or not write back is to be carried out on the basis of the coloring information to be described later in detail, in addition to the aforementioned access frequency information, and carries out write back associated with data for which it has been determined that write back is necessary.

The memory management device 3 carries out wear leveling on the basis of the coloring information. For example, the memory management device 3 allocates high write frequency data in the volatile semiconductor memory 5 selected from among the volatile semiconductor memory 5 and nonvolatile semiconductor memories 61 to 6n. For example, the memory management device 3 stores high write frequency data in the SLC NAND flash memory selected from among the SLC NAND flash memory and MLC NAND flash memory of the nonvolatile semiconductor memories 61 to 6n.

It should be noted that the OS 9 of this embodiment may execute control of changing a memory area of the SLC NAND flash memory of the nonvolatile semiconductor memories 61 to 6n to the MLC NAND flash memory, and control of changing a memory area of the MLC NAND flash memory of the nonvolatile semiconductor memories 61 to 6n to the SLC NAND flash memory.

FIG. 18 is a block diagram showing an example of a relationship between the memory management device 3 according to this embodiment, and various data stored in the memory device.

A memory device 28 corresponds to the volatile semiconductor memory 5, and nonvolatile semiconductor memories 61 to 6n.

The memory management device 3 stores memory use information 29, memory peculiarity information 30, address translation information 31, and a coloring table 32 in the memory device 28.

In the volatile semiconductor memory 5, part of the coloring table 32 stored in the nonvolatile semiconductor memories 61 to 6n may be stored. For example, among the contents of the coloring table 32 stored in the nonvolatile semiconductor memories 61 to 6n, the coloring information which is frequently used may be stored in the volatile semiconductor memory 5. The memory management device 3 manages access to the memory device 28 by referring to the coloring table 32, and the like.

When the nonvolatile semiconductor memories 61 to 6n are utilized as the main memory, the frequency of access to the nonvolatile semiconductor memories 61 to 6n becomes higher than the case where the nonvolatile semiconductor memories 61 to 6n are utilized as a secondary memory, and the life of each of the nonvolatile semiconductor memories 61 to 6n becomes shorter. In this embodiment, the information processing device 1 uses the memory device 28 formed by compounding the volatile semiconductor memory 5, SLC nonvolatile semiconductor memory, and MLC nonvolatile semiconductor memory into a main memory. The memory device 28 is a main memory of the heterogeneous composition type, in which allocation of data is managed by the memory management device 3.

The memory use information 29 includes the number of times of write occurrence, number of times of read occurrence of each page area of the nonvolatile semiconductor memories 61 to 6n, number of times of erase of each block area, and size of an in-use area.

The memory peculiarity information 30 includes a memory size of the volatile semiconductor memory 5, memory size of each of the nonvolatile semiconductor memories 61 to 6n, page size and block size of the nonvolatile semiconductor memories 61 to 6n, and access-enabled upper limit number of times (write-enabled upper limit number of times, read-enabled upper limit number of times, and erase-enabled upper limit number of times) of each memory area. Here, the page size implies a unit of the data size of write or read of the nonvolatile semiconductor memories 61 to 6n. The block size implies a unit of the data erase size of the nonvolatile semiconductor memories 61 to 6n. In the nonvolatile semiconductor memories 61 to 6n, the block size is larger than the page size.

The address translation information 31 is information using to translate a logical address given from the processors P1 to P4 into a physical address corresponding to the logical address.

The coloring table 32 is a table in which coloring information for each data is held. The coloring information includes static color information and dynamic color information.

The memory management device 3 includes an address management section 33, read management section 34, write management section 35, coloring information management section 36, memory use information management section 37, and relocation section 38. Furthermore, the coloring information management section 36 includes an access frequency calculation section 39, and dynamic color information management section 40.

The address management section 33 allocates a physical address to a logical address, and stores the allocation result in the address translation information 31. Thereby, the memory management device 3 can acquire a physical address corresponding to a logical address by referring to the address translation information 31.

When the processor P1 to P4 issues a read request, the read management section 34 manages read processing of data to be read with respect to the memory device 28.

When the processor P1 to P4 issues a write request, the write management section 35 manages write processing of data to be written with respect to the memory device 28.

The coloring information management section 36 manages the coloring table 32.

The memory use information management section 37 manages the memory use information 29 of the memory device 28.

The relocation section 38 carries out relocation of data allocated in a physical address corresponding to an arbitrary logical address on the basis of coloring information included in the coloring table 32, and can executes asynchronous operation with operations of the processors P1 to P4. The relocation section 38 periodically relocates data a read frequency or write frequency of which are high among data included in the MLC nonvolatile semiconductor memory to the SLC nonvolatile semiconductor memory on the basis of, for example, the dynamic color information. Further, the relocation section 38 periodically relocates data a read frequency or write frequency of which are low among data included in the SLC nonvolatile semiconductor memory to the MLC nonvolatile semiconductor memory on the basis of, for example, the dynamic color information. Likewise, the relocation section 38 can carry out relocation of data between the volatile semiconductor memory, and nonvolatile semiconductor memories 61 to 6n. In the write processing, the write management section 35 executes determination processing of a write destination memory area, and determination processing of a write destination block area each time an update of data occurs to relocate the data.

The access frequency calculation section 39 calculates access frequency information (dynamic write frequency DW_color, and dynamic read frequency DR_color) of data on the basis of the coloring information included in the coloring table 32.

The dynamic color information management section 40 manages dynamic color information included in the coloring table 32.

FIG. 19 is a view showing an example of the coloring information and coloring table 32 according to this embodiment.

In this embodiment, coloring information is imparted to each data. The data size unit of data to which coloring information is imparted is, for example, the least unit of read/write. For example, the least unit of read/write is the page size of the NAND flash memory. In the following, although a description will be given on the assumption that the data size of data correlated with coloring information by the coloring table 32 is a page size, the data size is not limited to this.

In the coloring table 32, coloring information is correlated with each data, and coloring information is stored in units of entries. An index is imparted to each entry of the coloring table 32. The index implies a value produced on the basis of the logical address. When a logical address specifying data is given, the read management section 34, write management section 35, coloring information management section 36, relocation section 38, and the like refer to an entry managed by an index corresponding to the logical address to acquire coloring information of the data.

The coloring information is information used as a criterion for determining an allocation area of each data, and includes static color information, and dynamic color information. The static color information is information produced on the basis of the characteristic of the data to which coloring information is imparted, and is information serving as a hint for determining an allocation (write) area of the data in the memory device 28. The dynamic color information is information including at least one of the number of times, and frequency of read/write of data.

The static color information includes the degree of significance of the data, a value SW_color indicating the static write frequency, SR_color indicating the static read frequency, data life SL_color, and time ST_color at which data is produced.

The degree of significance implies a value set by assuming the significance of the data on the basis of the type or the like of the data. The degree of significance is assumed on the basis of, for example, a characteristic of a file held in the file system or a characteristic of an area primarily used for a program.

The static write frequency SW_color implies a value set by assuming a frequency at which the data is written on the basis of the type or the like of the data. The static read frequency SR_color implies a value set by assuming a frequency at which the data is read on the basis of the type or the like of the data. For example, regarding the static write frequency SW_color, a larger value is set for data the write frequency of which is assumed to be higher. For example, regarding the static read frequency SR_color, a larger value is set for data the read frequency of which is assumed to be higher.

The data life SL_color implies a value set by assuming a period (life of data) during which the data is used as data without being erased on the basis of the type or the like of the data.

The static color information is a value statically predetermined by a program (process) producing data. Further, the OS 9 may predict static color information on the basis of a file extension, file header or the like of data.

The dynamic color information includes the number of times of write of data DWC_color, and number of times of read of data DRC_color. Here, the number of times of write of data DWC_color implies the number of times of write to the memory device 28 for the data. The number of times of read of data DRC_color implies the number of times of read from the memory device 28 for the data. The dynamic color information management section 40 manages the number of times of write to the memory device 28 on the basis of the number of times of write of data DWC_color for each data. The dynamic color information management section 40 manages the number of times of read from the memory device 28 on the basis of the number of times of read of data DRC_color for each data. As described previously, the memory device 28 is used as the main memory. Accordingly, data processed by the processor 21 to P4 is written to the memory device 28, and is read from the memory device 28. The dynamic color information management section 40 increments the number of times of write of data DWC_color by one each time the data is written. Further, the dynamic color information management section 40 increments the number of times of read of data DRC_color by one each time the data is read.

The access frequency calculation section 39 calculates a dynamic write frequency DW_color based on the number of times of write of data DWC_color. The access frequency calculation section 39 calculates a dynamic read frequency DR_color based on the number of times of read of data DRC_color.

The dynamic write frequency DW_color implies a value indicating the frequency of at which the data is written to the memory device 28. The dynamic read frequency DR_color implies a value indicating the frequency at which the data is read from the memory device 28.

Here, a method of calculating the dynamic write frequency DW_color and dynamic read frequency DR_color on the basis of the dynamic color information and static color information will be described below.

When new data is produced at a data production time, coloring information (including the data production time) is produced for the newly produced data, is registered in a new entry of the coloring table 32, and the data is then written to the memory device 28. After the data production time, access (read, write) to this data occurs, whereby the number of times of access (number of times of write DWC_color, and number of times of read DRC_color) increases with the elapse of time. The increase in the number of times of access is carried out by the dynamic color information management section 40. The access frequency calculation section 39 realized by the memory management device 3 calculates the dynamic write frequency DW_color and dynamic read frequency DR_color based on the number of times of access.

The number of times of write of the data DWC_color and number of times of read of the data DRC_color at the current time can be obtained by referring to the coloring table 32. For example, the dynamic write frequency DW_color at the current time is obtained by time averaging of the number of times of write of the data DWC_color from the data production time ST_color to the current time. Further, for example, the dynamic read frequency DR_color at the current time is obtained by time averaging of the number of times of read of the data DRC_color from the data production time ST_color to the current time. Thereby, the dynamic write frequency DW_color and dynamic read frequency DR_color of the data are calculated based on the dynamic color information (the number of times of write DWC_color, and number of times of read DRC_color).

The write management section 35 determines a memory area to be used when data to be written is written to the memory device 28 on the basis of the memory use information 29, memory peculiarity information 30, and coloring table 32, and writes the data to be written to the determined memory area.

For example, the write management section 35 calculates the degree of wear (exhaustion) (=number of times of write/ write-enabled upper limit number of times) for each memory area of the memory device 28, and writes data of a low dynamic write frequency to a memory area of a high degree of wear.

For example, the write management section 35 writes data of a high dynamic write frequency to a memory area of a low degree of wear.

For example, the write management section 35 writes data the dynamic read frequency or the dynamic write frequency of which is "high" to a memory area of the volatile semiconductor memory 5, writes data the dynamic read frequency or the dynamic write frequency of which is "medium" to a memory area of the SLC NAND flash memory, and writes data the dynamic read frequency or the dynamic write frequency of which is "low" to a memory area of the MLC NAND flash memory.

When a memory area to which data is to be written is determined by the above-mentioned processing, the write management section 35 determines a physical address of the write destination. In this case, the write management section 35 refers to the coloring table 32 to appropriately select the physical address of the write destination, thereby preventing wear leveling from occurring, and reducing unnecessary erase processing.

Here, the wear leveling implies, for example, exchanging data between blocks in such a manner that a difference in the number of times of erase between a block in which the number of times of erase is the largest, and block in which the number of times of erase is the smallest falls within a predetermined threshold. For example, in the NAND flash memory, overwriting of data is not enabled without erase processing, and hence it is necessary that the transfer destination of data should be an unused block, whereby erase processing of a block originally storing data therein is caused.

It should be noted that in this embodiment, an SLC memory area may be switched to an MLC memory area, and an MLC memory area may be switched to an SLC memory area in accordance with the calculated degree of wear of each memory.

In this embodiment described above, processing of write, read, and erase associated with the memory device 28 is controlled by the memory management device 3.

It should be noted that when part of the processing of write, read, and erase associated with the memory device 28 is executed by software, it is possible to execute sophisticated wear leveling of a high degree of freedom, prevent a state where only part of memory areas of the memory device 28 is deteriorated from occurring, and realize achievement of a long life of the memory device 28.

In this embodiment, coloring information is transmitted from the OS 9 to the memory management device 3, and efficient and sophisticated wear leveling is carried out on the basis of the coloring information.

It should be noted that in this embodiment, the software 8 may be made part of the OS 9.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   a processor which executes an operating system;
   a determination section which determines inconsistency between first data and second data, the first data being stored in a nonvolatile semiconductor memory, and the second data being corresponding to the first data and stored in a semiconductor memory;
   a setting section which sets execution timing of write back based on access frequency information associated with the second data, the access frequency information being determined by the operating system based on an attribute of the second data and provided to the setting section; and
   a write back section which executes a write back operation based on the execution timing set by the setting section,
   wherein the access frequency information associated with the second data is determined based on whether the second data is data allocated in a stack area or a heap area, and
   when the second data is data allocated in the stack area or the heap area, the setting section sets the execution timing longer than a case when the second data is not data allocated in the stack area and the heap area.

2. The information processing device of claim 1, wherein the nonvolatile semiconductor memory is used as a main memory.

3. The information processing device of claim 1, wherein the access frequency information associated with the second data is determined based on a number of accesses to the second data.

4. The information processing device of claim 1, further comprising a profile section which monitors access to the second data, and calculates access frequency information associated with the second data.

5. The information processing device of claim 1, wherein the access frequency information includes a number of times of access to the second data occurring per unit time.

6. The information processing device of claim 1, further comprising:
   a memory controller which controls the nonvolatile semiconductor memory; and
   wherein
   at least one of the determination section, the setting section, and the write back section is realized by the memory controller.

7. The information processing device of claim 1, further comprising a profile section which is constituted of hardware, and collects the access frequency information associated with the second data.

8. The information processing device of claim 1, wherein the access frequency information associated with the second data is determined based on a file extension or file header of a file to which the second data is related.

9. A memory system connectable to a host device, the host device including a semiconductor memory, the memory system comprising:
   an interface section which receives a command and data from an outside of the memory system;
   a nonvolatile semiconductor memory;
   a determination section which determines inconsistency between first data and second data, the first data being stored in the nonvolatile semiconductor memory, and the second data corresponding to the first data and stored in the semiconductor memory;
   a setting section which sets execution timing of write back based on access frequency information associated with the second data, the access frequency information being provided through the interface section from the host device;
   a write back section which executes a write back operation based on the execution timing set by the setting section,
   wherein the access frequency information associated with the second data is determined based on whether the second data is data allocated in a stack area or a heap area, and
   when the second data is data allocated in the stack area or the heap area, the setting section sets the execution timing longer than a case when the second data is not data allocated in the stack area and the heap area.

10. The memory system of claim 9, wherein the access frequency information associated with the second data is determined based on a file extension or file header of a file to which the second data is related.

11. The memory system of claim 9, wherein the access frequency information associated with the second data is determined based on whether the second data is data allocated in a stack area or a heap area.

12. The memory system of claim 9, wherein the access frequency information for the second data is determined based on a number of accesses to the second data.

* * * * *